(12) United States Patent
Mhatre et al.

(10) Patent No.: US 11,375,104 B2
(45) Date of Patent: Jun. 28, 2022

(54) SYSTEM FOR PRODUCING A CONTINUOUS IMAGE FROM SEPARATE IMAGE SOURCES

(71) Applicant: Apple Inc., Cupertino, CA (US)

(72) Inventors: Ameya A. Mhatre, San Francisco, CA (US); John P. Agnew, Palo Alto, CA (US); Matthew T. Fargo, San Francisco, CA (US); David M. Foster, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 16/791,762

(22) Filed: Feb. 14, 2020

(65) Prior Publication Data

US 2021/0051263 A1    Feb. 18, 2021

Related U.S. Application Data

(60) Provisional application No. 62/887,505, filed on Aug. 15, 2019.

(51) Int. Cl.
*H04N 5/232* (2006.01)
*H04N 5/073* (2006.01)
*H04N 5/247* (2006.01)

(52) U.S. Cl.
CPC ....... *H04N 5/23216* (2013.01); *H04N 5/0733* (2013.01); *H04N 5/23206* (2013.01); *H04N 5/247* (2013.01)

(58) Field of Classification Search
CPC .. H04N 5/23216; H04N 5/0733; H04N 5/247; H04N 5/23206; H04N 5/23238; H04N 5/2251; H04N 5/232; G03B 37/00; G03B 37/04; G06T 3/4038
See application file for complete search history.

(56) References Cited

U.S. PATENT DOCUMENTS

| | | | | |
|---|---|---|---|---|
| 9,264,598 | B1* | 2/2016 | Baldwin | H04N 5/23222 |
| 2005/0151852 | A1* | 7/2005 | Jomppanen | H04N 5/0733 |
| | | | | 348/E5.015 |
| 2012/0169842 | A1* | 7/2012 | Chuang | G08B 13/19682 |
| | | | | 348/E7.001 |
| 2015/0116453 | A1 | 4/2015 | Hirata et al. | |

(Continued)

OTHER PUBLICATIONS

Annex to Form PCT/ISA/206 Communication Relating to the Results of the Partial International Search dated Oct. 27, 2020, 7 pages.

(Continued)

*Primary Examiner* — Lin Ye
*Assistant Examiner* — John H Morehead, III
(74) *Attorney, Agent, or Firm* — Sterne, Kessler, Goldstein & Fox P.L.L.C.

(57) ABSTRACT

A system for producing a continuous image from separate image sources. The system may include an image-capture unit including two or more image-capture devices arranged in an outward-facing arrangement. The image-capture devices may have overlapping fields-of-view, and a processing device may combine images captured by the individual image-capture devices into a single, continuous image. The system may also include a control device that may control each of the individual image-capture devices. The control device may also synchronize image-capture of the individual image-capture devices.

32 Claims, 12 Drawing Sheets

(56) References Cited

U.S. PATENT DOCUMENTS

| | | | |
|---|---|---|---|
| 2016/0077422 A1* | 3/2016 | Wang | G03B 37/04 |
| | | | 348/38 |
| 2016/0088280 A1* | 3/2016 | Sadi | H04N 13/194 |
| | | | 348/48 |
| 2016/0088287 A1* | 3/2016 | Sadi | H04N 13/194 |
| | | | 348/43 |
| 2016/0248985 A1 | 8/2016 | Mate et al. | |
| 2016/0261829 A1* | 9/2016 | Olsson | H04N 5/2252 |
| 2016/0352982 A1 | 12/2016 | Weaver et al. | |
| 2016/0353089 A1 | 12/2016 | Gallup et al. | |
| 2017/0163880 A1* | 6/2017 | Oshima | G11B 27/031 |
| 2017/0295324 A1* | 10/2017 | Cabral | H04N 13/243 |
| 2017/0324941 A1* | 11/2017 | Birkler | H04N 5/23296 |
| 2017/0353658 A1 | 12/2017 | Colin | |
| 2018/0302569 A1* | 10/2018 | Cabral | H04N 13/178 |
| 2018/0324383 A1* | 11/2018 | Kaneko | H04N 5/77 |
| 2019/0056644 A1* | 2/2019 | Kong | G06F 3/017 |
| 2019/0058870 A1* | 2/2019 | Rowell | H04N 9/8227 |
| 2019/0082114 A1* | 3/2019 | Jeon | H04N 5/23241 |
| 2019/0306434 A1* | 10/2019 | Annau | H04N 5/247 |
| 2019/0364207 A1* | 11/2019 | Yang | H04N 5/247 |

OTHER PUBLICATIONS

Tricart, Celine. "Virtual Reality Filmmaking—Techniques & Best Practices for VR Filmmakers" Nov. 22, 2017. pp. 27-28.

\* cited by examiner

SYSTEM FOR PRODUCING A CONTINUOUS IMAGE FROM SEPARATE IMAGE SOURCES

CROSS-REFERENCE TO RELATED APPLICATION

This application claims priority to U.S. Provisional Patent Application No. 62/887,505, filed Aug. 15, 2019, titled "System for Producing a Continuous Image from Separate Image Sources," which is incorporated herein in its entirety by reference thereto.

FIELD

The described embodiments relate generally to image-capture systems. More particularly, the embodiments relate to image-capture systems for producing continuous images from separate image sources.

BACKGROUND

A photographer, videographer, or other person may desire to capture images using several image-capture devices, and combine the images captured by each of the individual devices into one continuous image. The combined, continuous image may have a greater field-of-view and include more image data than the individual images captured by the image-capture devices.

SUMMARY

Various embodiments are disclosed that relate to systems for producing continuous images from separate image sources. For example, such a system may include an image-capture unit, where the image-capture unit includes image-capture devices for simultaneously capturing images, and an image-capture structure for supporting the image-capture devices. In some embodiments, the image-capture devices are disposed radially around a central axis of the image-capture unit and are supported in fixed positions relative to each other and to the image-capture unit structure. In some embodiments, a centerline of the field-of-view of each of the image-capture devices is directed in an angled outward direction relative to the central axis. Further, the field-of-view of each image-capture device may overlap with the fields-of-view of two adjacent image-capture devices, and the fields-of-view of the image-capture devices together may comprise a 360 degree field-of-view.

In some embodiments, a system for producing a continuous image from separate image sources may include computing devices that each include an image-capture device, a processor, and memory. The system may also include a support structure for supporting the computing devices in fixed positions relative to each other and to the support structure. The system may also include a control device that may be configured to wirelessly communicate with each of the computing devices. In some embodiments, the control device is configured to simultaneously send commands to the computing devices, and each computing device is configured to independently adjust image-capture parameters of its respective image-capture device based on the commands received from the control device. Further, in some embodiments, the control device is configured to receive images captured by the image-capture devices in real-time.

Embodiments also include methods of producing continuous images from separate image sources. In some embodiments, such a method may include transmitting first electronic data from a control device to an image-capture device, where the first electronic data comprises the time the control device sent the first electronic data according to an internal clock of the control device. The method may also include transmitting second electronic data from the image-capture device to the control device, where the second electronic data comprises the time the first electronic data was received by the image-capture device according to an internal clock of the image-capture device. The method may also include determining the time difference between the internal clock of the control device and the internal clock of the image-capture device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
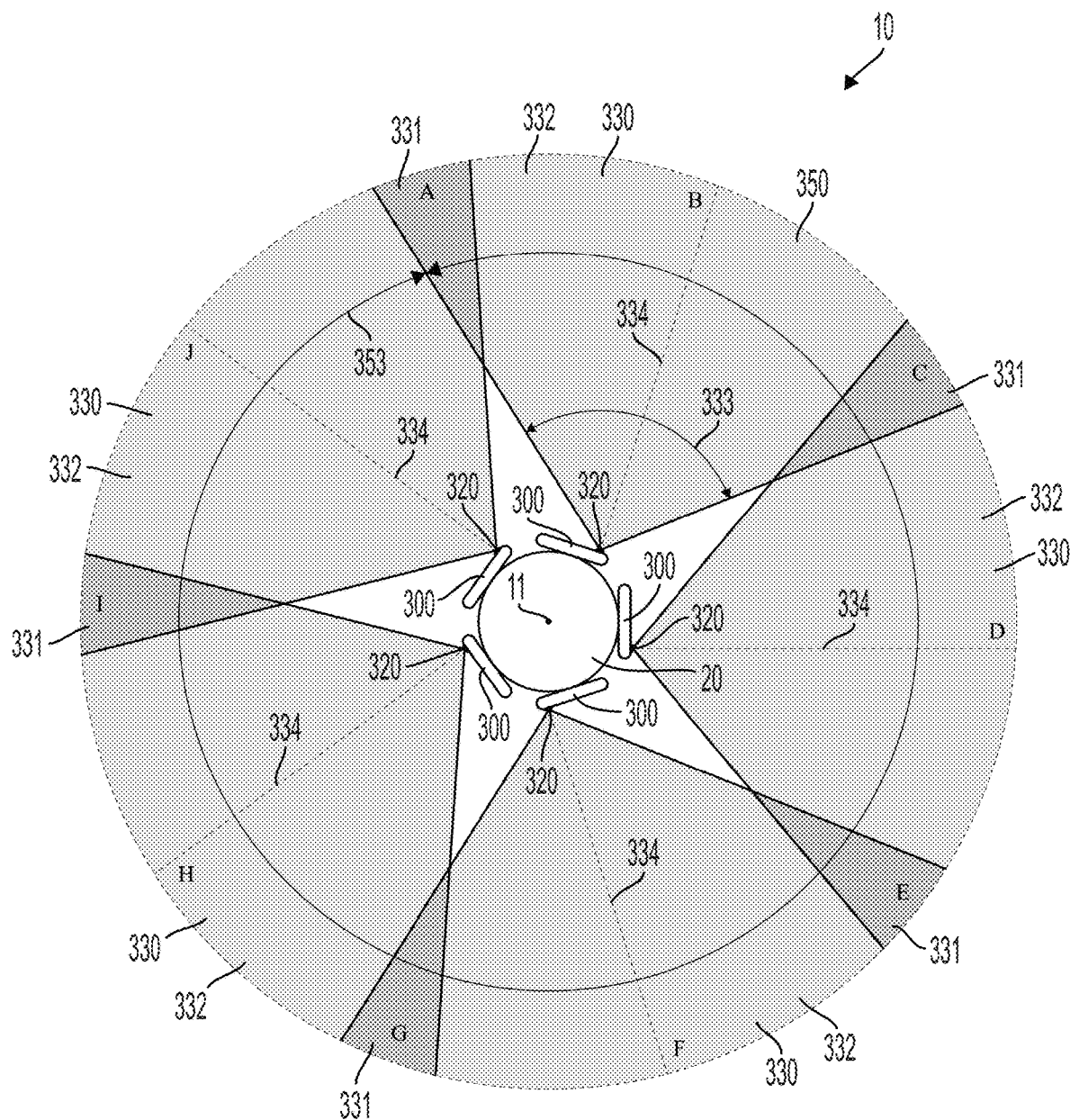
FIG. 1 shows a schematic top view of an image-capture unit.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some photographers, videographers, or other persons may desire to capture (i.e., record) compelling, high-quality images (e.g., video) for use in certain large-format applications such as, for example, panoramic videos, 360 degree videos, spherical videos, immersive videos, virtual reality videos, or the like. One factor that contributes to the overall quality of an image captured by an image-capture device is the resolution (e.g., number of pixels) of the image, which may be limited by the size and configuration of the image sensor (e.g., a camera sensor, digital camera sensor, imager, or other device that converts an optical image into an electronic signal) of the image-capture device. While some image-capture devices may permit users to capture high-resolution images in standard formats (e.g., 1:1, 4:3, 16:9, or the like), larger format images may require a relatively high resolution in order to maintain the fidelity of the image, which may exceed the resolution of the image sensor of some image-capture devices. Further, the desired field-of-view of the image (e.g., 360 degrees) may exceed the field-of-view of the lens of some image-capture devices. Although some lenses may have larger fields-of-view (e.g., wide-angle, fisheye, or 360 degree lenses) such lenses may inherently distort the images they are used to capture. In some applications such as, for example, virtual reality videos, such distortions may detract from a user's experience, since a sharp, undistorted image may contribute to a more immersive and engaging user experience. Such persons may also desire to simultaneously record audio along with their video, and may want that audio to be directionally-dependent, with audio associated with the direction from which is was received, and the simultaneous image recorded in that direction.

The present disclosure relates to image-capture units, which may be part of image-capture systems, and which may be used to capture large, high-resolution images in an easy and efficient manner. The image-capture units may include two or more image-capture devices that may simultaneously capture images from different perspectives. For example, the image-capture units may include a support structure that supports the image-capture devices in an outward-facing cylindrical arrangement relative to the support structure. The image-capture lenses of the image-capture devices may have overlapping fields-of-view and, thus, images captured by the image-capture devices may include overlapping portions. A processing device (e.g., a computing device such as, for example, a tablet computer, a laptop, or a desktop computer) may then compare and combine the overlapping portions of the images together (e.g., "stitch" the overlapping portions together) such that a single, continuous image is formed. Accordingly, the single, continuous image may have a higher resolution and a larger field-of-view than any of the individual images captured by the image-capture devices.

In some embodiments, the image-capture devices may be commercially-available image-capture devices (e.g., cameras, smartphones, or the like), and may each include a processor, internal memory, and battery. In some embodiments, the image-capture devices may each be a standalone consumer-level computing device (e.g., a smartphone). Thus, the image-capture unit may include no external wiring (e.g., for external power or memory), which may increase the flexibility and ease of use of the image-capture unit. In some embodiments, the image-capture system includes a control device (e.g., a computing device such as, for example, a tablet computer) that may be used, for example, to control certain image-capture parameters of the image-capture devices, to preview images captured by the image-capture devices, and to synchronize image-capture timing of the image-capture devices. In some embodiments, the control device may communicate with the image-capture devices using a wireless, peer-to-peer network.

In some embodiments, each image-capture device may simultaneously capture audio from the direction in which it captures video. In a playback scenario (e.g., in virtual reality (VR) or panoramic playback) using audio and video captured from multiple devices simultaneously, the video seen and the audio heard by a user can be dependent on the direction in which the user is looking, providing a highly-immersive audio-visual experience.

These and other embodiments are discussed below with reference to FIGS. 1-12. However, those skilled in the art will readily appreciate that the detailed description given herein with respect to these figures is for explanatory purposes only and should not be construed as limiting.

As shown in FIG. 1, an image-capture unit 10 may include an image-capture unit structure 20 and image-capture devices 300. Image-capture device 300 may be, for example, an electronic device having an image-capture lens 320 for capturing images (e.g., still images and/or video). In some embodiments, image-capture device 300 may be a digital camera such as, for example, a compact digital camera, a digital single-lens reflex camera ("DSLR"), a mirrorless camera, or the like. In some embodiments, image-capture device 300 may be a computing device and may include, for example, a processor, internal memory, and a battery. In some embodiments, image-capture device 300 may be an electronic device that includes an image-capture lens 320 but also has other features and functionality such as, for example, a smartphone. Image-capture device 300 may include features and functionality such as, for example, wireless networking capability, internal memory, and an internal battery. In some embodiments, image-capture device 300 may also be configured to capture estimated depth information related to captured images (described in further detail below). In some embodiments, image-capture device 300 includes features and functionality unrelated to capturing images such as, for example, a telephone.

Each image-capture device 300 may include a field-of-view 330. Field-of-view 330 may be, for example, the area that is observable through image-capture lens 320 of image-capture device 300. In some embodiments, field-of-view 330 is the area that is observable through image-capture lens 320 as perceived by an image sensor (e.g., a camera sensor, digital camera sensor, imager, or other device that converts an optical image into an electronic signal) of image-capture device 300. FIG. 1 shows a schematic top view of image-capture unit 10 and fields-of-view 330 of image-capture devices 300. Although fields-of-view 330 are represented by a two-dimensional schematic in FIG. 1, for example, fields-of-view 330 may be three-dimensional (e.g., conical, originating at lenses 320). Further, fields-of-view 330 are not necessarily shown to scale. For example, the outer boundary of fields-of-view 330 (represented by a dashed broken line in FIG. 1, for example) is included for ease of illustration, but the extent to which field-of-view 330 extends from image-capture device 300 may vary.

Figure 12:
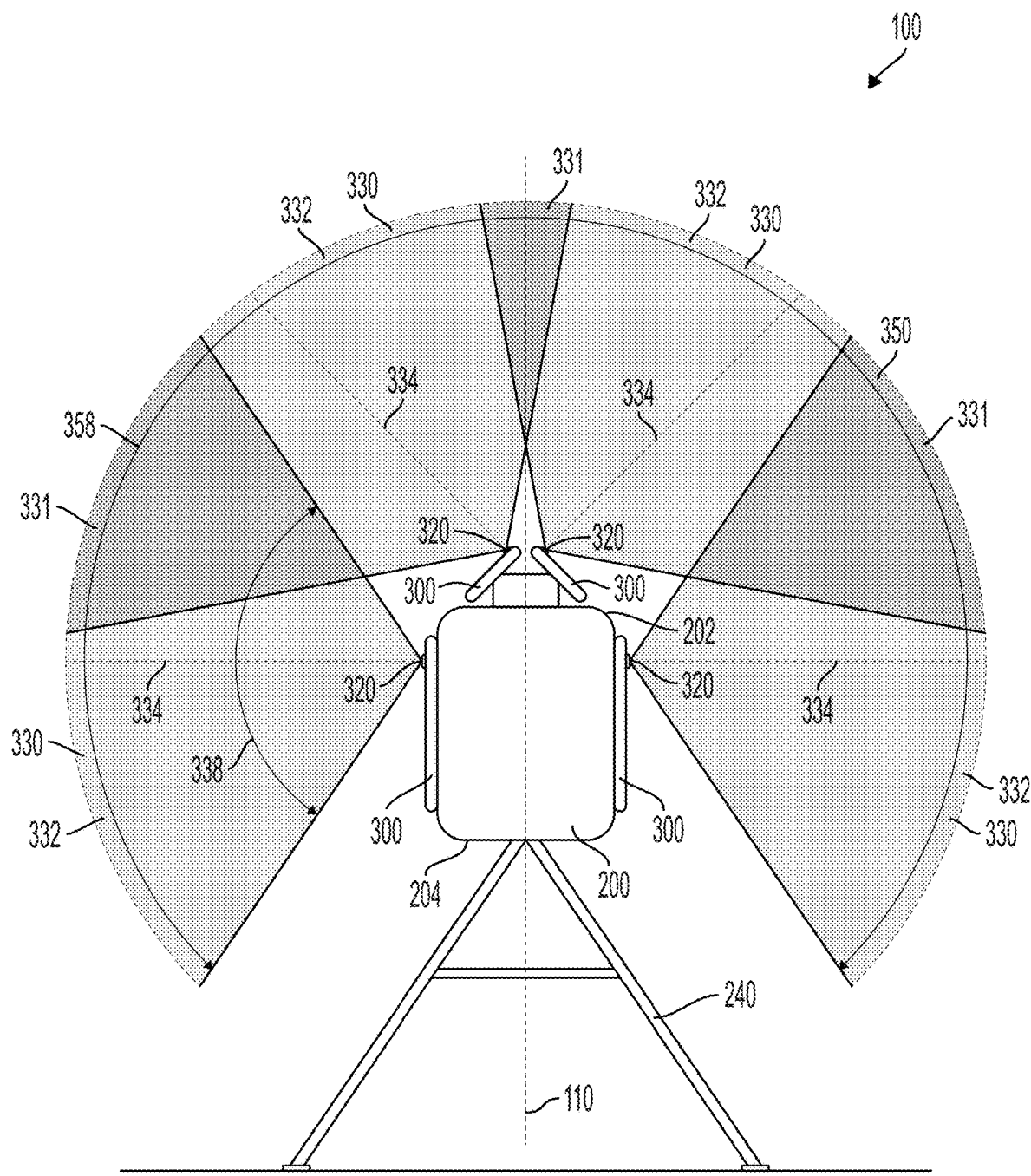
FIG. 12 shows a schematic side view of the image-capture unit of FIG. 3, with added upper image-capture devices.

Each field-of-view 330 may include a field-of-view centerline 334, which may be, for example, the optical axis of image-capture lens 320. Field-of-view 330 may be defined by an angle-of-view 333. Angle-of-view 333 may be, for example, the angular extent (e.g., angular size) to which field-of-view 330 extends in a plane that is coplanar with field-of-view centerline 334. For example, such plane may also be perpendicular to a central axis 11 of image-capture unit 10, as shown in FIG. 1. Each angle-of-view 333 may be bisected by its respective centerline 334. In some embodiments, angle-of-view 333 may be the angular extent (e.g., angular size) to which field-of-view 330 extends in a horizontal plane that is coplanar with field-of-view centerline 334. As shown in FIG. 12, for example, field-of-view 330 may also be defined by an angle-of-view 338. Angle-of-view 338 may be, for example, the angular extent (e.g., angular size) to which field-of-view 330 extends in a plane that is coplanar with field-of-view centerline 334 and is parallel to central axis 11. In some embodiments, angle-of-view 338 may be the angular extent (e.g., angular size) to which field-of-view 330 extends in a vertical plane that is coplanar with field-of-view centerline 334.

In some embodiments, image-capture unit structure 20 may support image-capture devices 300 in fixed positions relative to each other and to image-capture unit structure 20. As shown in FIG. 1, for example, image-capture unit structure 20 may support image-capture devices 300 in a cylindrical arrangement. Although FIG. 1 shows image-capture unit 10 to have five image-capture devices 300, image-capture unit 10 may include any number of image-capture devices 300. For example, in some embodiments, image-capture unit 10 includes two, three, four, or more image-capture devices 300. In some embodiments, image-capture unit 10 includes twelve, thirteen, fourteen, fifteen, or more image-capture devices 300.

In some embodiments, each of field-of-view centerlines 334 of image-capture devices 300 are coplanar and extend in a plane that is perpendicular to central axis 11 of image-capture unit 10. In some embodiments, each of field-of-view centerlines 334 of image-capture devices 300 are disposed in the same horizontal plane (see, e.g., FIG. 12). In some embodiments, field-of-view centerline 334 of each image-capture device 300 may be directed in an outward direction relative to central axis 11. In some embodiments, field-of-view centerlines 334 are each directed in a generally radial outward direction relative to central axis 11 of image-capture unit 10 (see, e.g., FIG. 1). As described in further detail below, in some embodiments, field-of-view centerlines 334 are each directed in a non-radially outward direction relative to central axis 11 of image-capture unit 10 (see, e.g., FIG. 5).

In some embodiments, field-of-view 330 of a first image-capture device 300 may overlap with field-of-view 330 of a second image-capture device 300, which is to say that some or all of the area that is observable through image-capture lens 320 of the first image-capture device 300 may also be observable through image-capture lens 320 of the second image-capture device 300. In some embodiments, the field-of-view 330 of one image-capture device 300 may overlap with the fields-of-view 330 of two or more other image-capture devices 300. Since each image-capture device 300 may have a different physical position and orientation, the overlapping area (e.g., the area that is observable through the image-capture lenses 320 of two or more image-capture devices 300) may be observed from different perspectives corresponding to the relative positions and orientations of the image-capture devices 300.

As shown in FIG. 1, the field-of-view 330 of each image-capture device 300 may include an overlapping portion 331 (e.g., the portion of field-of-view 330 with darker gray shading) and a non-overlapping portion 332 (e.g., the portion of field-of-view 330 with lighter gray shading). Overlapping portion 331 may be the portion of field-of-view 330 of one image-capture device 300 that overlaps with the field-of-view 330 of another image-capture device 300. In some embodiments, field-of-view 330 of one image-capture device 300 may include several overlapping portions 331. As shown in FIG. 1, for example, the field-of-view 330 of each image-capture device 300 may overlap with the fields-of-view 330 of two adjacent image-capture devices 300. Thus, the field-of-view 330 of each image-capture device 300 may include two overlapping portions 331.

In some embodiments, each image-capture device 300 of image-capture unit 10 has the same angle-of-view 333. In some embodiments, each image-capture device 300 of image-capture unit 10 has a different angle-of-view 333. In some embodiments, some image-capture devices 300 have the same angle-of-view 333 and some have different angles-of-view 333. In some embodiments, image-capture lens 320 may have a fixed focal length. In some embodiments, image-capture lens 320 may have a variable focal length. In some embodiments, angle-of-view 333 of each image-capture device 300 may be changed, for example, by adjusting the focal length of image-capture lens 320. Accordingly, the amount of overlap between adjacent fields-of-view 330 may be changed, for example, by adjusting the focal length of image-capture lens 320.

In some embodiments, two or more fields-of-view 330 with overlapping portions 331 may together form a combined field-of-view 350. Combined field-of-view 350 may be, for example, the continuous area that is observable through at least one image-capture lens 320 of image-capture devices 300 with overlapping fields-of-view 330.

As shown in FIG. 1, in some embodiments, combined field-of-view 350 is defined by a combined angle-of-view 353. Combined angle-of-view 353 may be, for example, the angular extent (e.g., angular size) to which combined field-of-view 350 extends in a plane that is coplanar with field-of-view centerlines 334 of image-capture devices 300 with overlapping fields-of-view 330 and is perpendicular to central axis 11. In some embodiments, combined angle-of-view 353 may be the angular extent (e.g., angular size) to which combined field-of-view 350 extends in a horizontal plane that is coplanar with field-of-view centerlines 334 of image-capture devices 300 with overlapping fields-of-view 330.

As shown in FIG. 1, combined angle-of-view 353 may be 360 degrees. However, in some embodiments, combined angle-of-view 353 is less than 360 degrees. For example, in some embodiments, combined angle-of-view 353 is between approximately 360 degrees and 180 degrees. In some embodiments, combined angle-of-view 353 is between approximately 270 degrees and 180 degrees.

Figure 2A:
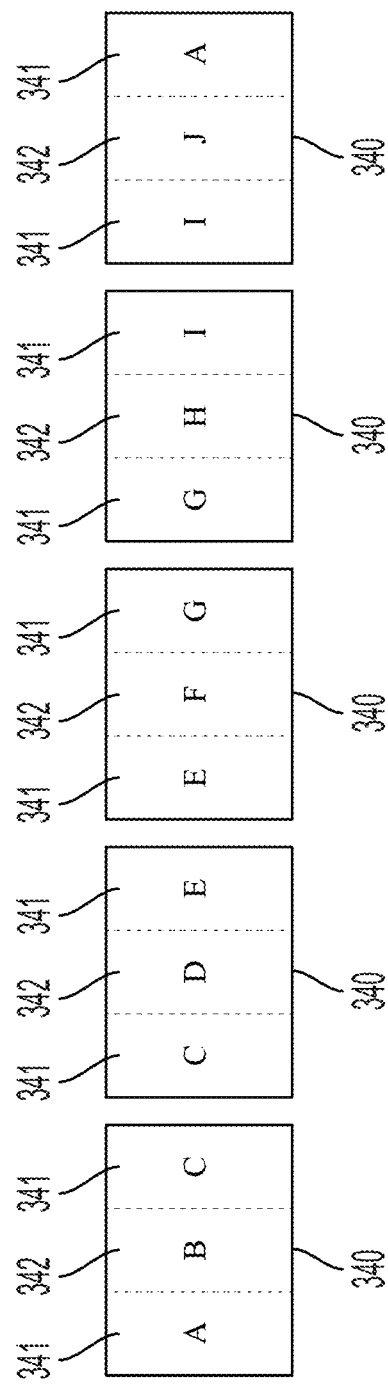
FIG. 2A shows a representation of example output images of the image-capture devices of FIG. 1.
Figure 2B:
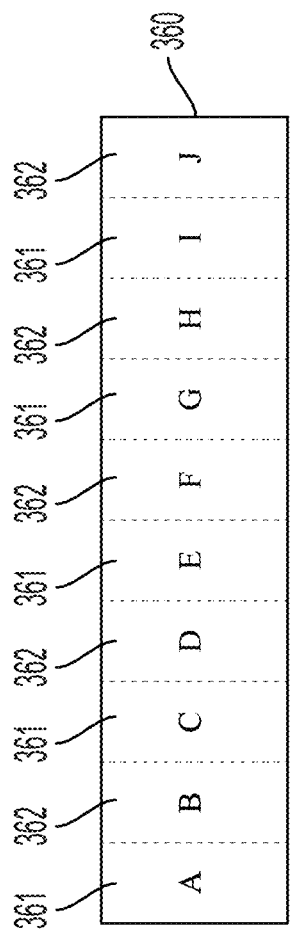
FIG. 2B shows a representation of the example output images of FIG. 2A, combined together into a continuous image.

With reference to FIGS. 2A and 2B, in some embodiments, each image-capture device 300 of image-capture unit 10 is configured to capture and produce an output image 340 (e.g., a still image or video). FIG. 2A, for example, shows output images 340 of image-capture devices 300 shown in FIG. 1. As shown in FIGS. 1 and 2A, for example, each image-capture device 300 of image-capture unit 10 may have an output image 340 corresponding to the device's field-of-view 330 (see, e.g., field-of-view "A B C" in FIG. 1 and output image "A B C" in FIG. 2A).

As described above, the field-of-view 330 of one image-capture device 300 may overlap with the fields-of-view 330 of one or more other image-capture devices 300. Accordingly, the output images 340 of image-captures devices 300 with overlapping fields-of-view 330 may include images of the same subject matter (e.g., from slightly different perspectives corresponding to the relative positions and orientations of the image-capture devices 300). As shown in FIG. 2A, output images 340 may include an overlapping portion 341 and a non-overlapping portion 342. Overlapping portion 341 may be the portion of output image 340 of one image-capture device 300 that also appear in the output image 340 of another image-capture device 300 (see, e.g., overlapping portions "A", "C", "E", "G", and "I" in FIG. 2A). Non-overlapping portion 342 may be the portion of output image 340 of one image-capture device 300 that includes subject matter that is not shown in the output image 340 of another image-capture device 300 (see, e.g., non-overlapping portions "B", "D", "F", "H", and "J" in FIG. 2A). In some embodiments, output image 340 of one image-capture device 300 may include several overlapping portions 341. For example, output image 340 of each image-capture device 300 may include two overlapping portions 341. In some embodiments, output images 340 of some image-capture devices 300 include two overlapping portions 341, and output images 340 of other image-capture devices 300 include only one overlapping portion 341. In some embodiments, output image 340 of an image-capture device 300 entirely overlaps with output images of its adjacent image-capture devices 300.

In some embodiments, a processing device (e.g., processing device 500 described below) may combine images captured by several image-capture devices 300 into one continuous image. FIG. 2B, for example, shows output images 340 of FIG. 2A, combined together into a combined image 360. As described in further detail below, processing device 500 may include a software application that compares and combines (e.g., "stiches") together images captured by image-capture devices 300 with overlapping fields-of-view 330 to produce a single, combined image 360.

In order to produce a single, combined image 360, processing device 500 may combine overlapping portions 341 together (e.g., so that their subject matter is not duplicated in the combined image). As shown in FIGS. 2A and 2B, for example, two overlapping portions 341 may be combined together to form one combined portion 361 (see, e.g., combined portions "A", "C", "E", "G", and "I" in FIG. 2B). Further, non-overlapping portions 342 may appear as non-combined portions 362 in combined image 360 (see, e.g., non-combined portions "B", "D", "F", "H", and "J" in FIG. 2B). In some embodiments, combined portions 361 and non-combined portions 362 may appear in an alternating pattern in combined image 360.

In some embodiments, combined image 360 may be a panoramic video, 360 degree video, spherical video, immersive video, virtual reality video, or the like. As shown in FIG. 2A, for example, overlapping portion "A" appears on the left-most output image 340 and the right-most output image 340. Accordingly, although combined image 360 is represented in two-dimensions, in some embodiments, combined image 360 may be an image that extends continuously for 360 degrees (e.g., without a defined end).

As mentioned above, image-capture device 300 may be configured to capture estimated depth information related to captured images. For example, image-capture device 300 may be configured to capture and record a depth map that is associated with a captured image. The depth map may include, for example, information relating to the distance of objects, surfaces, or other image subjects from image-capture lens 320. In some embodiments, image-capture device 300 may capture depth information using, for example, multi-camera depth estimation, "time-of-flight" sensor and/or camera (e.g., LIDAR) depth estimation, and/or structured light depth estimation. As such, by capturing visual image data (e.g., the visual appearance) and depth data, image-capture unit 100 may be used in other applications such as, for example, augmented reality applications, volumetric video capture, photogrammetry, and/or 3D reconstructions.

In some embodiments, image-capture device 300 may also be configured to capture audio. For example, each image-capture device may include an audio input 322 (see FIG. 3), such as a microphone (e.g., a microphone of a smartphone, in embodiments where image-capture device is a smartphone). In image capture unit 10, as shown in FIG. 1, for example, each image-capture device 300 is arranged oriented in a different direction with overlapping fields-of-view 330 to together produce a combined image 360, as described above. In such an arrangement, while each image-capture device 300 is capturing images (e.g., video) it may simultaneously be capturing audio. And the audio captured by each image-capture device 300 may be dependent on the direction in which image-capture device 300 is oriented, just as the images captured are dependent on this direction. For example, audio input 332 of each image-capture device 300 may capture audio from the direction of field-of-view 330 of its respective image-capture device 300.

In some embodiments, captured audio can be split into two channels for each image-capture device 300, and thus each image-capture device 300 can be configured to record highly-directional audio with the same orientation as its image-capture lens 320. In this way, each image-capture device 300 may receive and capture (i.e., record) different audio, and this audio can be associated with the simultaneously-captured images (e.g., video) from the same image-capture device 300. Captured audio can be stored separately, or embedded in video files with image data. Image-capture unit 100 can combine this audio into multi-channel audio that has each channel mapped to a different direction (known as "spacial audio").

Such spacial audio may be used, for example, in VR and panoramic video playback. For example, an audio output (e.g., headphones) may output different audio to a user depending on the direction that their head is facing, so that the user hears audio that was captured in that relative direction. In some embodiments, the audio output corresponds with video that is being displayed in the direction that the user's head is facing, such video having been captured from the same direction (e.g., using the same image-capture device 300) as the audio channel being output to the user. As the user moves their head, the audio output can change to correspond with the new direction that their head is facing, in real time. Depending on the configuration of image-capture unit 10, the large number of directional audio channels can provide a highly-immersive audio experience. For example, in an image-capture unit 10 with 10 image-capture devices 300 (e.g., smartphones), this would mean 20 channels of audio. In an image-capture-unit 10 with 14 image-capture devices 300, this would mean 28 channels of audio.

In some embodiments, image-capture unit 100 may also be used in image-based lighting ("IBL") applications. For example, image-capture devices 300 may be used to capture light information such as, for example, intensity, direction, and temperature, of the ambient light surrounding image-capture unit 100. Processing device 500, for example, may then use the captured light information to simulate lighting for objects (e.g., real or synthetic) in the scene (e.g., in combined image 360). Such a configuration may allow a highly-detailed real-world-based lighting model to be used to light the scene, rather than generating a synthetic lighting model using, for example, light rendering software.

Figure 3:
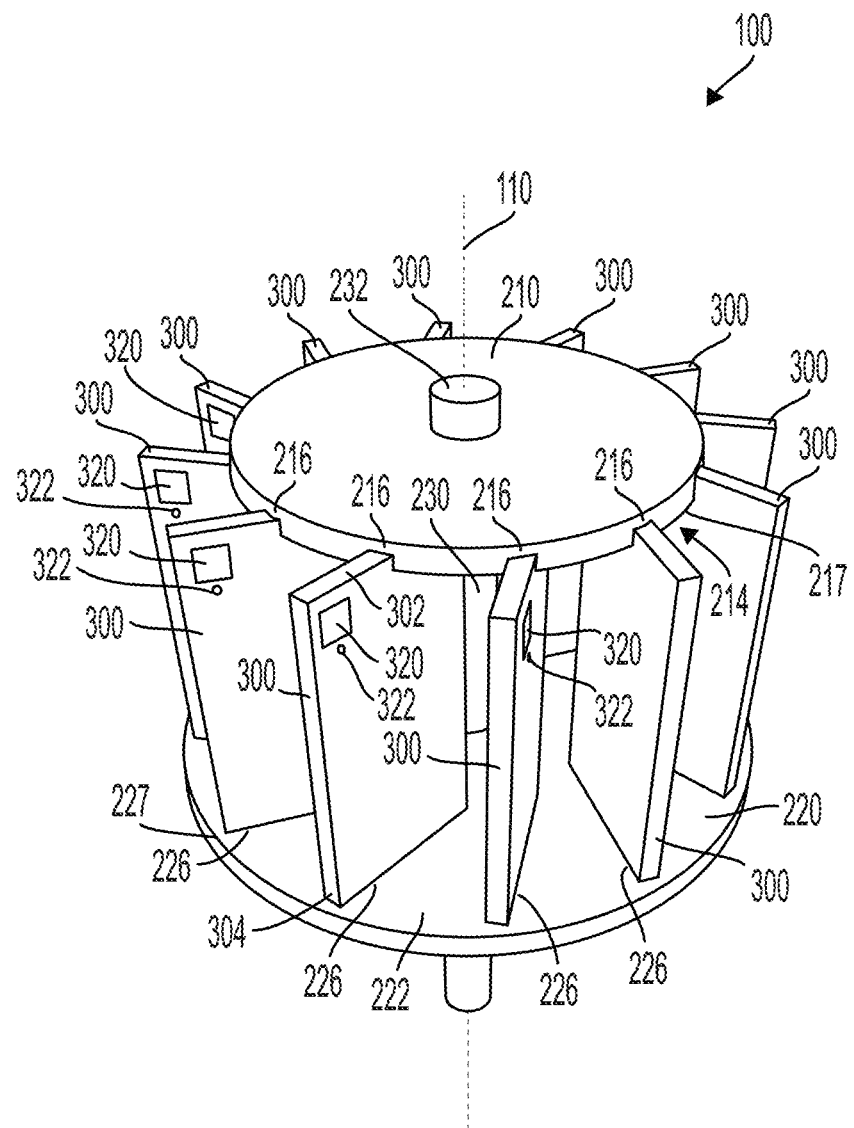
FIG. 3 shows a perspective view of an image-capture unit.

As shown in FIG. 3, for example, an image-capture unit 100 may be generally cylindrical in shape. However, image-capture unit 100 may take other shapes as well such as, for example, conical, frustoconical, spherical, prismatic, triangular prismatic, rectangular prismatic, or cubical, and it may or may not be symmetrical about any axis. Image-capture unit 100 may include some or all of the features described above with respect to image-capture unit 10. In some embodiments, image-capture unit 100 may have a footprint area of less than 3 square feet. In some embodiments, image-capture unit 100 may have a footprint area of less than 1 square foot.

Image-capture unit structure 200 (which may include some or all of the features described above with respect to image-capture unit structure 20) may include a top portion 210 and a bottom portion 220. In some embodiments, a support member 230 may extend between top portion 210 and bottom portion 220 and may support top portion 210 and bottom portion 220 in fixed positions relative to each other.

In some embodiments, top portion 210 has a cylindrical shape. In some embodiments, top portion 210 has a circular disc shape. Top portion 210 may take other shapes as well such as, for example, a triangular solid shape, rectangular solid shape, pentagonal solid shape, hexagonal solid shape, or other shape, and it may or may not be symmetrical about any axis. In some embodiments, relative to central axis 110, top portion 210 may be rotationally symmetric. In some embodiments, relative to central axis 110, top portion 210 may have rotational symmetry of at least an order of 2. In some embodiments, top portion 210 may be axisymmetric relative to central axis 110. In some embodiments, bottom portion 220 has a cylindrical shape. In some embodiments, bottom portion 220 has a circular disc shape. Bottom portion 220 may take other shapes as well such as, for example, a triangular solid shape, rectangular solid shape, pentagonal solid shape, hexagonal solid shape, or other shape, and it may or may not be symmetrical about any axis. In some embodiments, relative to central axis 110, bottom portion 220 may be rotationally symmetric. In some embodiments, relative to central axis 110, bottom portion 220 may have rotational symmetry of at least an order of 2. In some embodiments, bottom portion 220 may be axisymmetric relative to central axis 110.

In some embodiments, top portion 210 and bottom portion 220 have the same general shape (e.g., a circular disc shape). In some embodiments, top portion 210 is smaller than bottom portion 220. For example, top portion 210 and bottom portion 220 may each have a circular disc shape, and a circular face (e.g., bottom surface 214) of top portion 210 may have a smaller diameter than a circular face (e.g., top surface 222) of bottom portion 220. In some embodiments, bottom surface 214 of top portion 210 and top surface 222 of bottom portion 220 are parallel to one another.

In some embodiments, support member 230 has a cylindrical shape. Support member 230 may take other shapes as well such as, for example, a triangular solid shape, rectangular solid shape, pentagonal solid shape, hexagonal solid shape, or other shape, and it may or may not be symmetrical about any axis. In some embodiments, support member 230 extends in an axial direction relative to central axis 110. In some embodiments, top portion 210, bottom portion 220, and/or support member 230 may be separable, for example, to facilitate easy transport of image-capture unit structure 200, or to release image-capture devices 300 from image-capture unit structure 200 (described further below). For example, top portion 210 may be removable from support member 230. In some embodiments, image-capture unit 200 may include a fastener 232 (e.g., a knob, screw, clamp or the like) that may couple top portion 210 to support member 230. For example, support member 230 may include a threaded portion that extends through an opening in top portion 210, and fastener 232 may include a threaded portion that meshes with the threaded portion of support member 230. The threaded portion of support member 230 may have a smaller diameter than other portions of support member 230, and fastener 232 may have a larger diameter than the opening in top portion 210. Thus, top portion 210 may be secured between support member 230 and fastener 232 by coupling fastening 232 and support member 230 together.

In some embodiments, top portion 210 may include a device securement portion 216. Device securement portion 216 may be, for example, a recess, groove, or the like in bottom surface 214 of top portion 210 that is configured to receive image-capture device 300. Likewise, bottom portion 220 may include a device securement portion 226. Device securement portion 226 may be, for example, a recess groove, or the like in top surface 222 of bottom portion 220 that is configured to receive image-capture device 300. In some embodiments, device securement portions 216 may extend through an outer edge 217 of top portion 210 (see, e.g., FIG. 3). In some embodiments, device securement portions 226 may be spaced inward from an outer edge 227 of bottom portion 220. In some embodiments, a device securement portion 216 may be aligned (e.g., vertically) with each device securement portion 226 such that each pair of device securement portions 216, 226 may support and secure one image-capture device 300. For example, image-capture device 300 may have a first end 302 and a second end 304. In some embodiments, device securement portion 216 may receive and support first end 302 of image-capture device 300. Further, device securement portion 226 may receive and support second end 304 of image-capture device 300. Thus, image-capture device 300 may be supported and secured between top portion 210 and bottom portion 220. In some embodiments, image-capture devices 300 are secured to image-capture unit structure 200 only by device securement portions 216, 226 when image-capture unit structure 200 is assembled. For example, as described above, top portion 210 may be removable from support member 230. Accordingly, to install image-capture devices 300 in image-capture unit structure 200, top portion 210 may first be removed. Then, second end 304 of each image-capture device 300 may be inserted into a respective device securement portion 226. Then, top portion 210 may be coupled to support member 230 (e.g., as described above) and aligned such that a respective device securement portion 216 may be aligned with first end 302 of each image-capture device 300. The distance (e.g., vertical distance) between bottom surface 214 of top portion 210 and top surface 222 of bottom portion 220 may be less than the distance (e.g., vertical distance) between first end 302 and first end 304 of image-capture device 300. Thus, since top portion 210 is fixed in portion relative to bottom portion 220 by support member 230, image-capture devices 300 may be secured between top portion 210 and bottom portion 220 by device securement portions 216, 226.

In some embodiments, a second end 204 (e.g., a bottom end) of image-capture unit structure 200 may be disposed on, coupled to, or integrally formed with an image-capture unit support 240 (see, e.g., FIG. 12). Image-capture unit support 240 may be, for example, a tripod, bipod, monopod, gimbal, harness, stabilizer, support arm, or other stationary or moving support device or support system. In some embodiments, support member 230 may extend through bottom portion 220 (e.g., for connecting to image-capture unit support 240).

In some embodiments, image-capture unit structure 200 may include no electronic components. In some embodiments, bottom portion 220 of image-capture unit structure 200 includes holes such that wiring, connectors, cables, or the like may extend through bottom portion 220 and may be received by image-capture devices 300. In some embodiments, such holes may be disposed in some or all of device securement portions 226 of bottom portion 220 such that wiring, connectors, cables, or the like may be connected to, for example, ports on second ends 304 of image-capture devices 300 while second ends 304 are secured by device securement portions 226. In some embodiments, image-capture unit structure 200 includes integrated wiring, connectors, cables, or the like that may be received by image-capture devices 300. Such wiring, connectors, cables, or the like may be used, for example, to charge image-capture devices 300, or to upload data to and/or download data from image-capture devices 300 while the devices are secured in image-capture unit structure 200. However, during use (e.g., while capturing images) each image-capture device 300 may capture images without any wired connection to another component of image-capture unit 100. In some embodiments, image-capture unit structure 200 may be made using additive manufacturing (e.g., 3D printing or the like).

Figure 4:
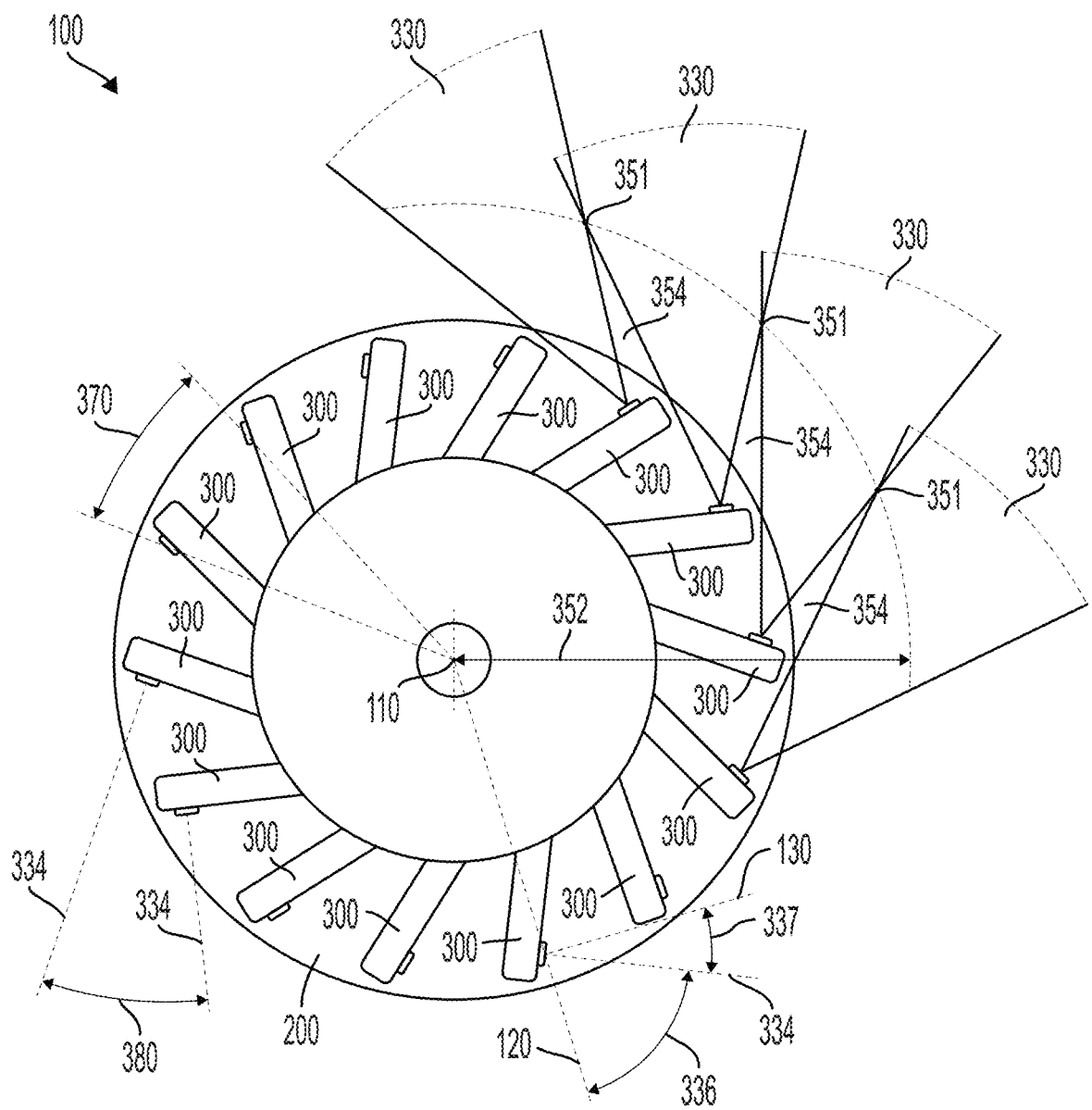
FIG. 4 shows a schematic top view of the image-capture unit of FIG. 3.
Figure 5:
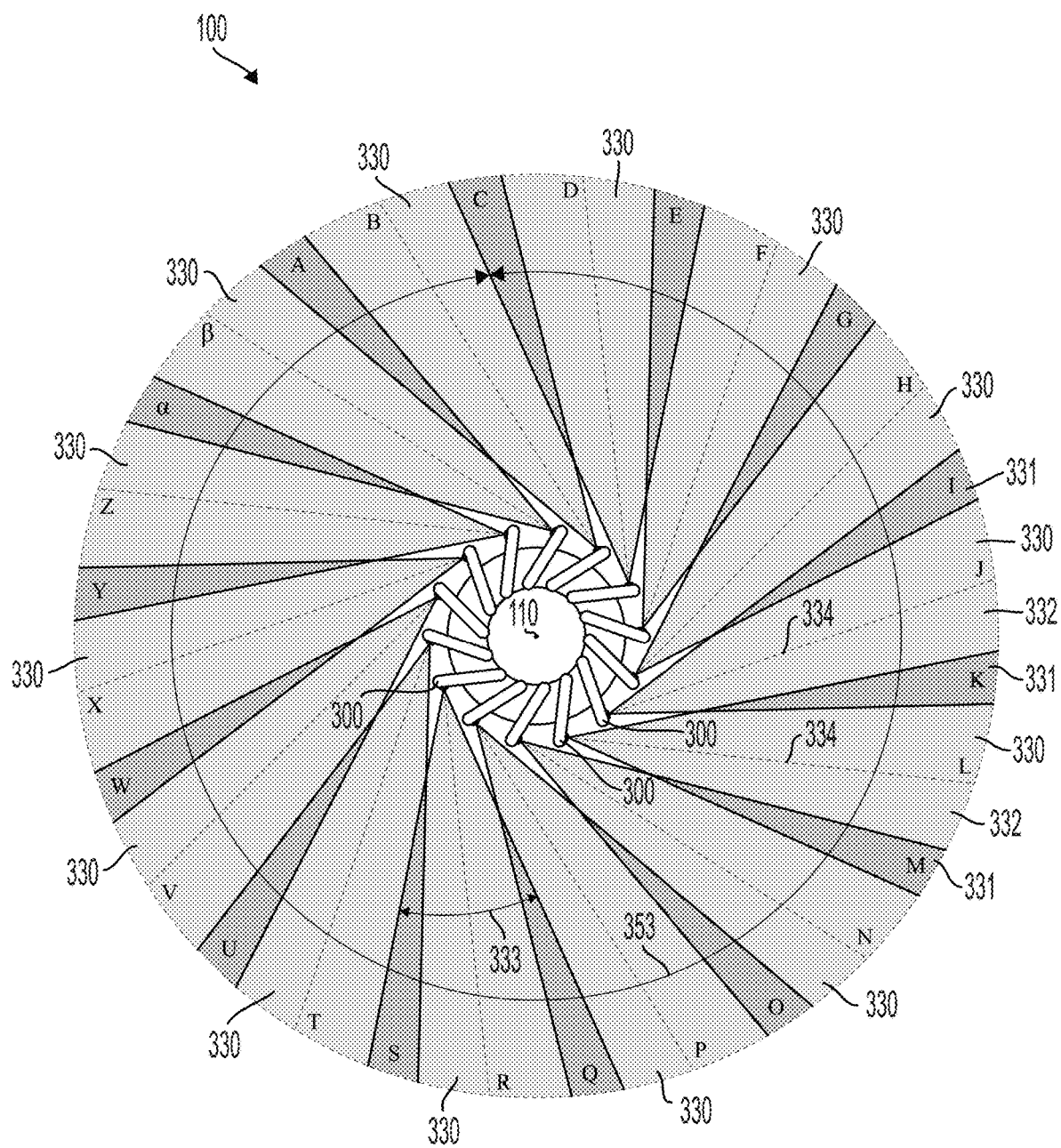
FIG. 5 shows a schematic top view of the image-capture unit of FIG. 3.

With references to FIGS. 3-5, image-capture devices 300 may be disposed radially around a central axis 110 (which may have the same characteristics as central axis 11, described above) of image-capture unit 100. In some embodiments, image-capture devices 300 may be disposed in a cylindrical arrangement, and may be fixed relative to each other by image-capture unit structure 200. In some embodiments, image-capture devices 300 may be fixed relative to each other by image-capture unit structure 200 within a 3 square foot area. As shown, image-capture unit 100 may include fourteen image-capture devices 300, however, image-capture unit 100 may include any number of image-capture devices 300 sufficient to effect the features described herein. For example, image-capture unit 100 may include twelve, thirteen, fourteen, or more image-capture devices 300. In some embodiments, image-capture devices 300 may be spaced equally around central axis 110. In some embodiments, image-capture devices 300 may be spaced relative to central axis 110 at a spacing angle 370. Spacing angle 370 may be, for example, the angle between a first line that extends from central axis 110 through the center of image-capture lens 320 of a first image-capture device 300 and a second line that extends from central axis 110 through the center of image-capture lens 320 of a second image-capture device 300. In some embodiments, spacing angle 370 may be approximately 10-45 degrees. In some embodiments, spacing angle 370 may be approximately 20-30 degrees.

As shown in FIGS. 3 and 4, for example, image-capture devices 300 may be disposed in a pinwheel arrangement relative to central axis 110. For example, image-capture devices 300 may be generally of a rectangular solid shape (see, e.g., FIG. 3). In some embodiments, image-capture devices 300 have two generally parallel front and rear surfaces that are surrounded by thinner edge surfaces. Thus, each image-capture device 300 may have a major central plane that is parallel to and disposed midway between the front and rear surfaces. When viewed from above (e.g., as in FIG. 4), image-capture devices 300 may form a pinwheel arrangement around central axis 110, with the major central planes of the image-capture devices 300 not intersecting with central axis 110. Further, field-of-view centerline 334 of each image-capture device 300 may be oriented in a direction that is perpendicular to the major central plane of the respective image-capture device 300. Thus field-of-view centerlines 334 of image-capture devices 300, together, may also form a pinwheel arrangement about central axis 110. In some embodiments, there are at least 5 image-capture devices 300 that together form the pinwheel arrangement. In some embodiments, there are at least 10 image-capture devices 300 that together form the pinwheel arrangement. In some embodiments, there are 14 image-capture devices 300 that together form the pinwheel arrangement.

Combined field-of-view 350 may include an overlapping radius 352, which may be defined by the distance between central axis 110 and overlapping points 351 (e.g., the points where two adjacent fields-of-view 330 first overlap). Overlapping radius 352 may be, for example, the distance from central axis 110 to a circle that passes through each of overlapping points 351. Combined field-of-view 350 may only be continuous at a distance greater than or equal to overlapping radius 352. In some embodiments, at a distance from central axis 110 that is greater than overlapping radius 352, there may be no area that is not visible by at least one image-capture device 300. In some embodiments, at a distance less than overlapping radius 352, there may be uncaptured portions 354, which may be areas that are not in the field-of-view of any image-capture device 300.

As shown in FIGS. 4 and 5, field-of-view centerline 334 of each image-capture device 300 may be directed in a non-radial direction with respect to central axis 110. Since field-of-view centerlines 334 are directed in a non-radial direction, overlapping radius 352 may be less than if field-of-view centerlines 334 were directed in a radial direction. Reducing overlapping radius 352 may, for example, facilitate a greater amount of overlap between adjacent fields-of-view 330 which may, for example, improve the ability of processing device 500 to combine output images 340, thereby improving the quality of combined image 360. Further, reducing overlapping radius 352 may reduce the size of uncaptured portions 354, which may improve the flexibility and usability of image-capture unit 100, for example, by permitting image-capture unit 100 to capture images in small spaces, or to capture images of subjects disposed relatively close to image-capture unit 100. In some embodiments, overlapping radius 352 may be less than 5 feet. In some embodiments, overlapping radius 352 may be less than 3 feet.

In some embodiments, the field-of-view centerline 334 of one image-capture device 300 may be disposed at a relative field-of-view angle 380 relative to the field-of-view centerline 334 of another image-capture device 300. In some embodiments, relative field-of-view angle 380 is between approximately 20 and 45 degrees. In some embodiments, the output images 340 of adjacent image-capture devices 300 may overlap by at least 30 percent. In some embodiments, the output images 340 of adjacent image-capture devices 300 may overlap by at least 50 percent. In some embodiments, the ratio of overlapping portions 341 to non-overlapping portions 342 may be approximately 1:3. In some embodiments, the ratio of overlapping portions 341 to non-overlapping portions 342 may be approximately 1:2. In some embodiments, the ratio of overlapping portions 341 to non-overlapping portions 342 may be approximately 1:1.

As mentioned above, in some embodiments, field-of-view centerline 334 may be directed in a non-radially outward direction. As shown in FIG. 4, centerline 334 may be directed in a direction defined by a radial angle 336 and a tangential angle 337. Radial angle 336 may be, for example, the angle between field-of-view centerline 334 and a radial line 120 that extends from central axis 110 and passes through the origin of field-of-view centerline 334 (e.g., image-capture lens 320). Tangential angle 337 may be, for example, the angle between field-of-view centerline 334 and a tangential line 130 that extends perpendicular to radial line 120 and passes through the origin of field-of-view centerline 334 (e.g., image-capture lens 320). In some embodiments, radial line 120, tangential line 130, and field-of-view centerline 334 are coplanar. In some embodiments, radial line 120, tangential line 130, and field-of-view centerline 334 are each disposed in the same horizontal plane.

Radial angle 336 and tangential angle 337 may be complementary angles. In some embodiments, radial angle 336 may be approximately zero degrees. In some embodiments, radial angle 336 may be at least 30 degrees. In some embodiments, radial angle 336 may be at least 45 degrees. In some embodiments, radial angle 336 may be between 45 to 60 degrees. In some embodiments, radial angle 336 may be sized such that image-capture devices 300 are positioned just outside of the field-of-view 330 (e.g., closer to central axis 110) of an adjacent image-capture device 300, such that overlapping radius 352 may be minimized without image-capture devices 300 themselves appearing in output images 340.

Figure 6A:
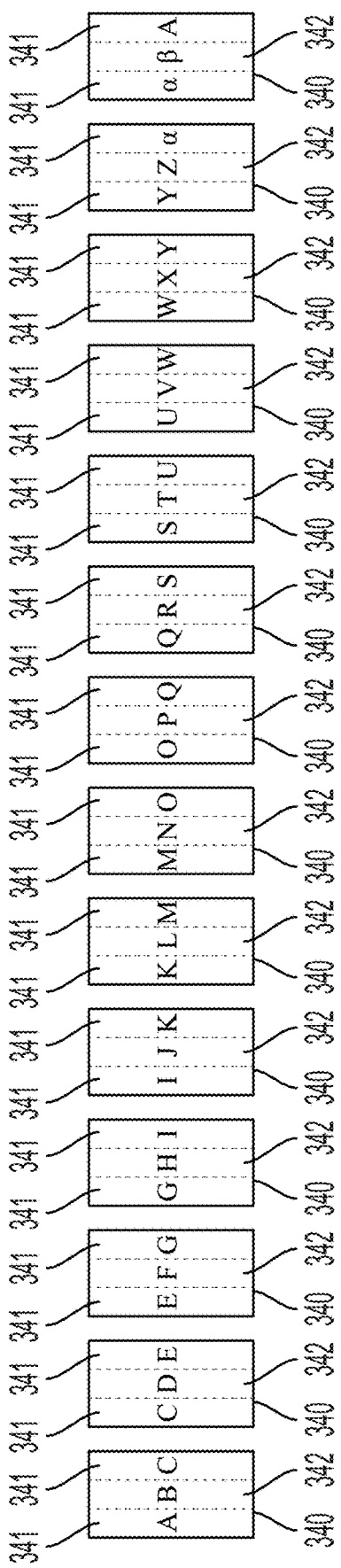
FIG. 6A shows a representation of example output images of the image-capture devices of FIG. 3.
Figure 6B:
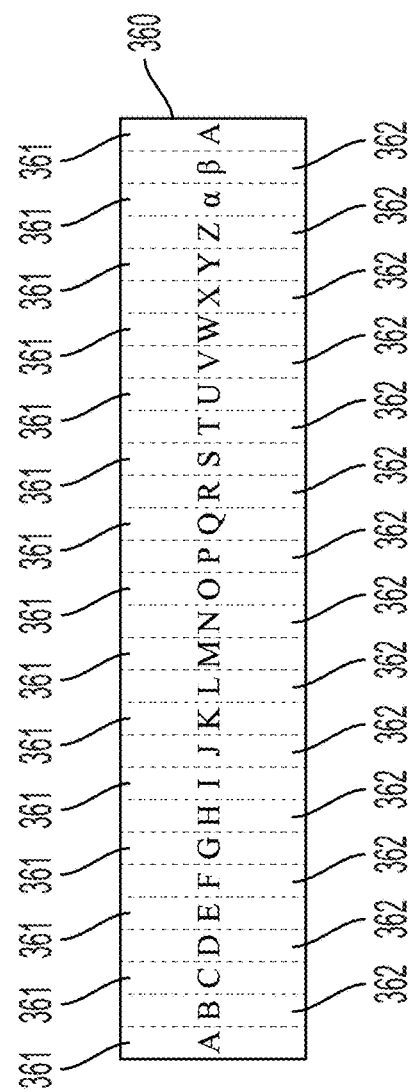
FIG. 6B shows a representation of the example output images of FIG. 6A, combined together into a continuous image.

In some embodiments, each image-capture device 300 of image-capture unit 100 is configured to capture and produce an output image 340, and output images 340 may be combined together to form a single, continuous combined image 360. FIG. 6A, for example, shows output images 340 of image-capture devices 300 shown in FIG. 5, and FIG. 6B shows output images 340 of FIG. 6A, combined together into a combined image 360. Since the image-capture unit of FIG. 5 includes more image-capture devices 300 than the image-capture unit of FIG. 1, however, each output image 340 may form a smaller portion of the combined image 360. Thus, compared to image-capture unit 100 of FIG. 1 (which has only 5 devices), image-capture unit 100 of FIG. 5 (which has 14 devices) may produce a higher-resolution combined image 360. For example, in some embodiments, each image-capture device 300 may be configured to capture high-resolution images. In some embodiments, each image-capture device 300 may be configured to capture 4K video, 6K video, or other high-resolution video. In some embodiments, each video may be shot at, for example, 30 frames per second, 60 frames per second, or at another frame rate. In some embodiments, combined image 360 may be, for example, 4K video, 12K video, 16K video, or other high-resolution video.

As mentioned above, image-capture device 300 may be a smartphone, which may increase the flexibility of use and modularity of image-capture unit 100. For example, each image-capture device 300 may be used independently as a smartphone and, in this manner, may be used for purposes other than capturing images. Since smartphones are often personally-owned devices, several people who own smartphones may come together and use their personal device (e.g., temporarily) as a part of image-capture unit 100. Then, after a recording session is over, each person may take their smartphone back and once again use it as a personal device. Further, some smartphones are replaced periodically. Thus, a user may extend the useful life of an old smartphone, for example, by using it as a part of image-capture unit 100. Such flexibility may, for example, allow users to create high-resolution, 360-degree imagery without the need for an expensive dedicated system. Further, since image-capture device 300 may be a smartphone, each image-capture device 300 will be capable of recording and embedding its own audio tracks with captured images. Audio channels can be automatically synchronized using the same process as video, as described elsewhere herein.

Further, since image-capture devices 300 may be commercially-available devices, image-capture devices 300 may be easy to replace. For example, image-capture devices 300 may be readily-available at a retail store, which may provide a convenient source for new and/or replacement image-capture devices 300 (e.g., if an image-capture device 300 is lost or malfunctions). As mentioned above, smartphones are often personally-owned devices. Thus, if an image-capture device 300 malfunctions, for example, a user of image-capture unit 100 may replace the malfunctioning image-capture device 300 with their own personal smartphone, and then continuing using image-capture unit 100. However, even if no replacement image-capture device 300 is available, image-capture unit 100 may still operate with fewer than the maximum number of image-capture devices 300 that image-capture unit structure 200 is configured to support. For example, image-capture unit structure 200 may be configured to secure and support 14 image-capture devices 300. However, image-capture unit 100 may operate with less than 14 image-capture devices 300. For example, image-capture unit 100 may operate with only 7 image-capture devices 300, with a device secured in every other pair of device securement portions 216, 226, or with devices secured in consecutive pairs of device securement portions 216, 226 (e.g., to capture 180 degree imagery).

Figure 7:
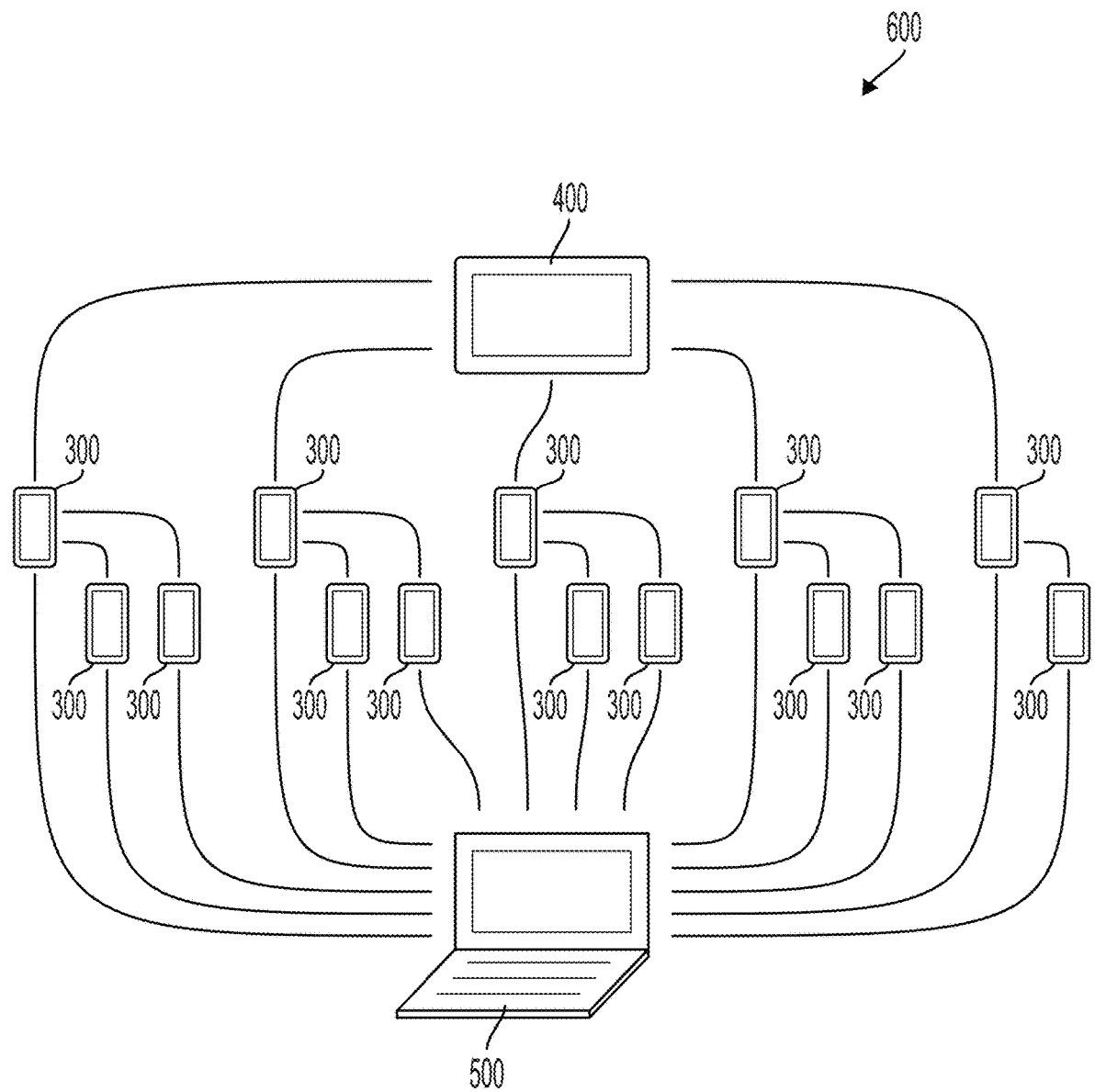
FIG. 7 shows a schematic diagram of an exemplary network including the image-capture devices of FIG. 3, a control device, and a processing device.

As shown in FIG. 7, image-capture devices 300 may communicate with a control device 400 and/or a processing device 500 over a network 600. Image-capture devices 300 may also communicate with one another over network 600. Network 600 may be or may include, for example, a Peer-to-Peer Network, Local Area Network ("LAN"), Wireless Local Area Network ("WLAN"), Campus Area Network ("CAN"), Metropolitan Area Network ("MAN"), or Wide Area Network ("WAN"). In some embodiments, image-capture devices 300, control device 400, and/or processing device 500 each include a transceiver that is configured to send and receive information wirelessly. The transceivers may be configured to operate on a variety of frequencies, such as Very High Frequency (e.g., between 30 MHz and 300 MHz) or Ultra High Frequency (e.g., between 300 MHz and 3 GHz) ranges, and may be compatible with specific network standards such as cell phone, WIFI™, or BLUETOOTH® wireless networks, for example. In some embodiments, image-capture devices 300, control device 400, and/or processing device 500 may connect to network 600 using a wired connection (e.g., Ethernet or the like).

In some embodiments, image-capture devices 300 may communicate with one another, control device 400, and/or a processing device 500 using only peer-to-peer connections, which is to say that no additional network devices (e.g., a server, router, or ISP) are necessary for communication between image-capture devices 300, control device 400 and/or processing device 500. In this manner, image-capture devices 300, control device 400, and/or processing device 500 may communicate without requiring any external network infrastructure (e.g., a router), thus allowing the system to be used in remote locations, for example, without any dedicated external network or internet connection.

Figure 8:
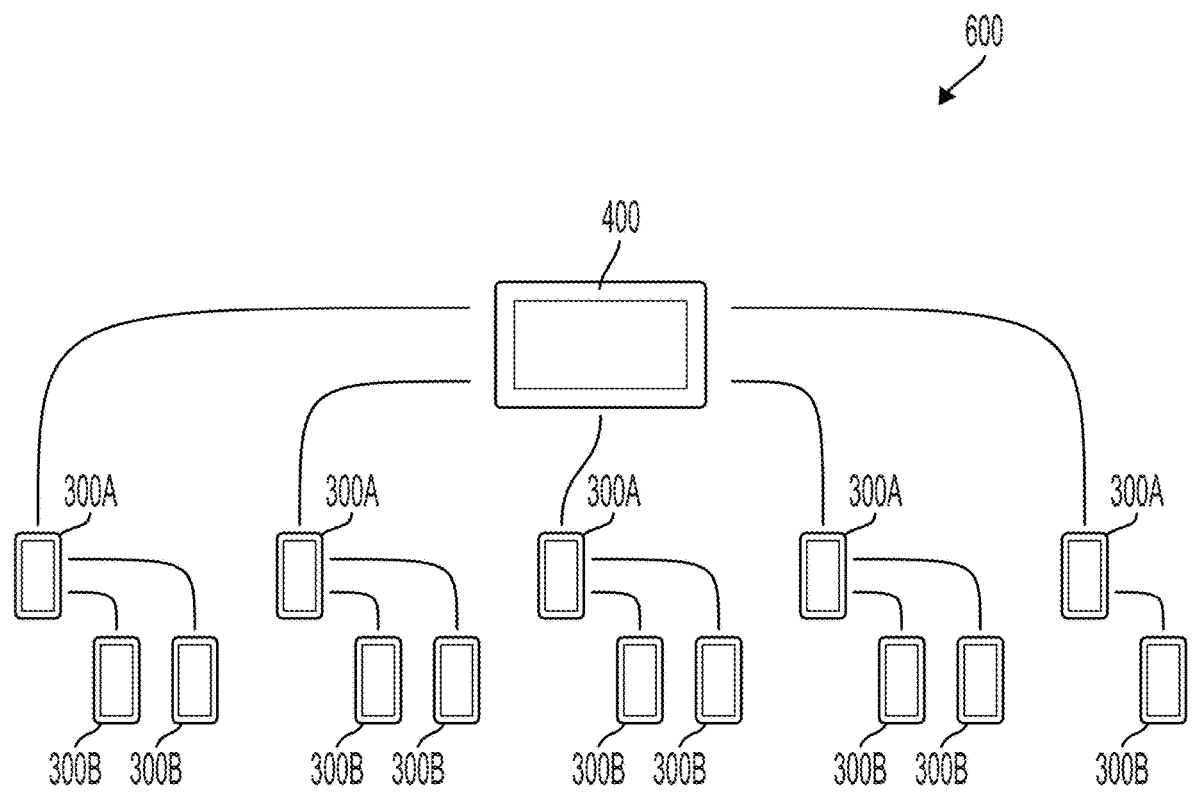
FIG. 8 shows a schematic diagram of an exemplary network including the image-capture devices and the control device of FIG. 7.
Figure 9:
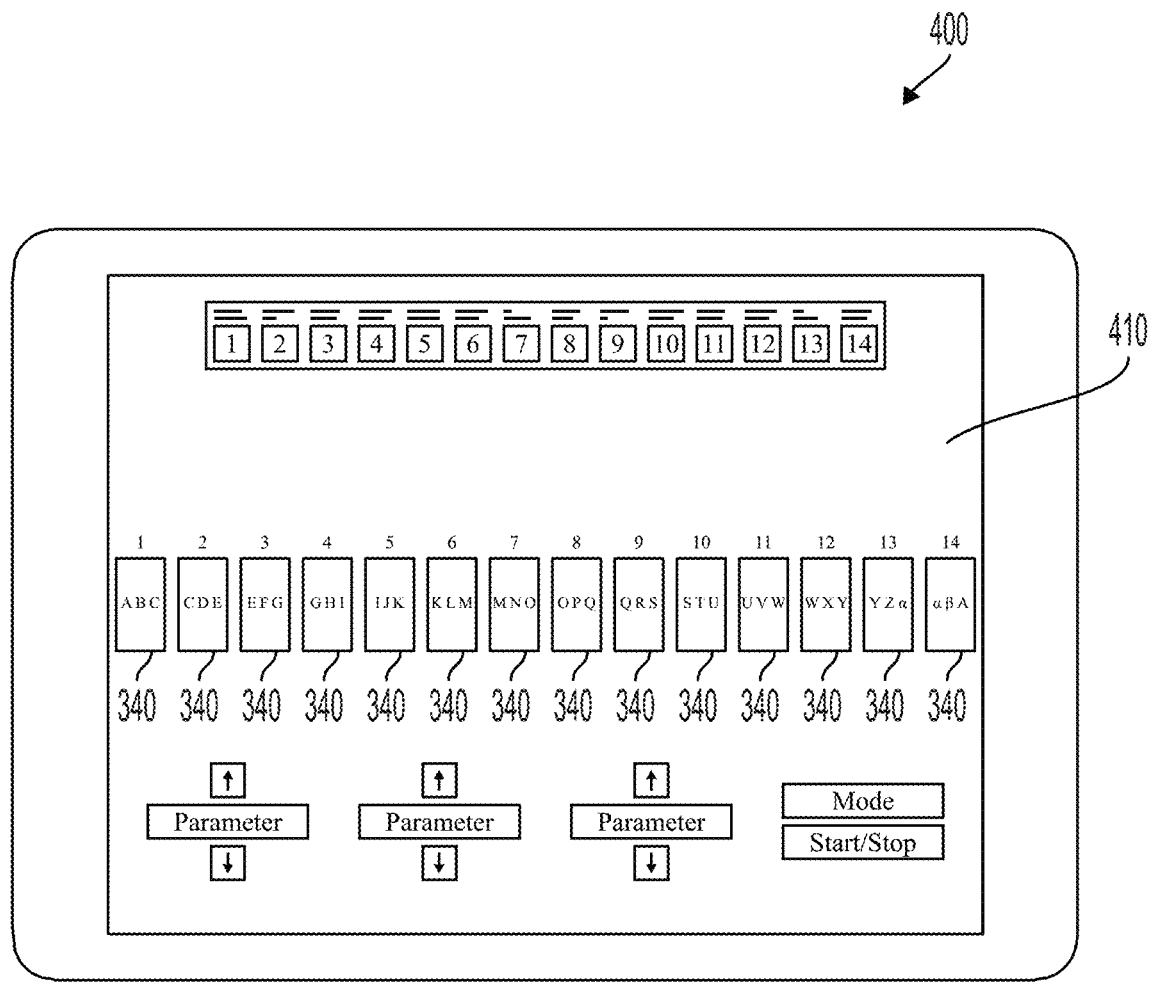
FIG. 9 shows a front view of the control device of FIG. 7.
Figure 10:
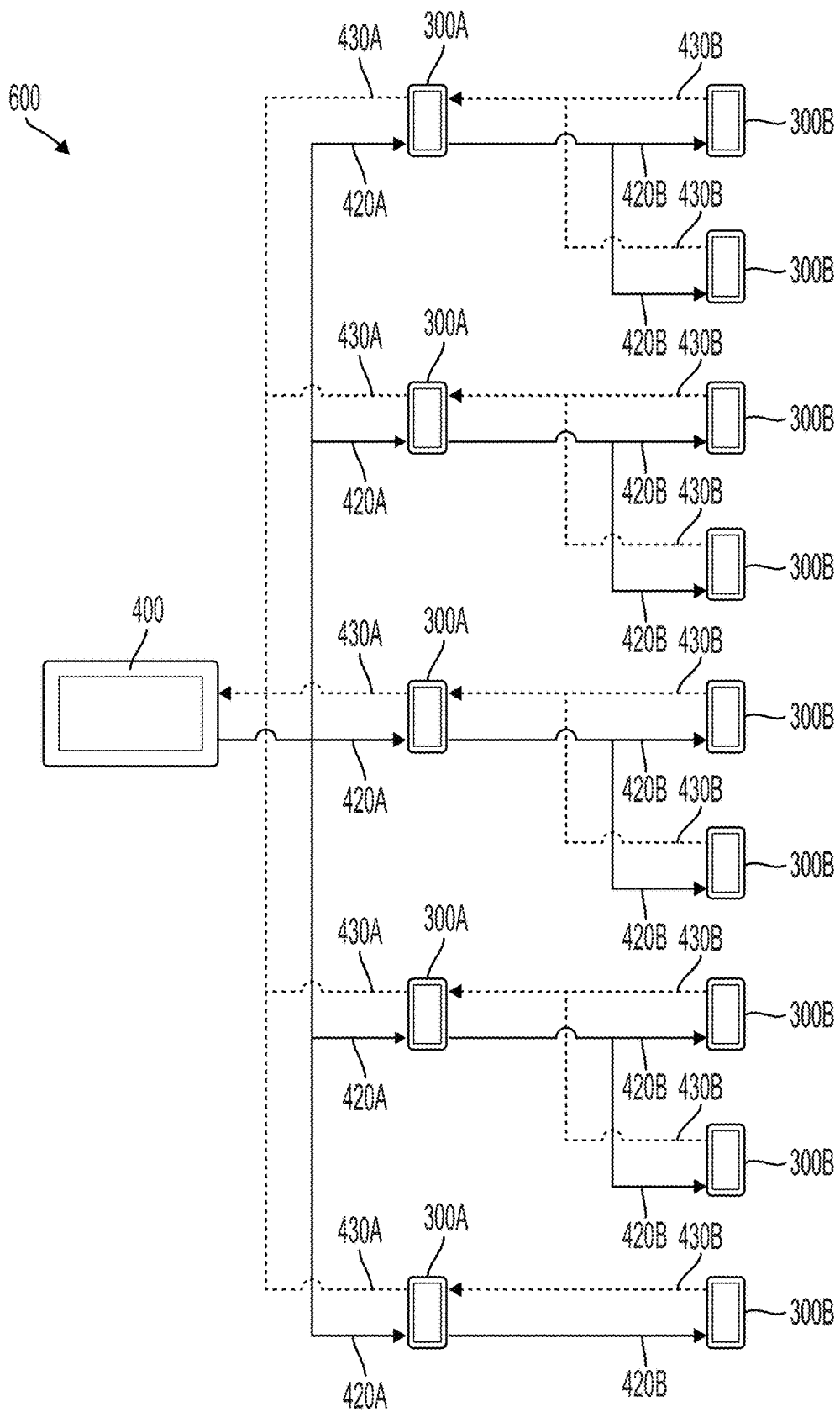
FIG. 10 shows a schematic diagram of an exemplary network including the image-capture devices and the control device of FIG. 7.

With reference to FIGS. 8-10, control device 400 may communicate with and control image-capture devices 300. In some embodiments, control device 400 may be a computing device and may include, for example, a processor, internal memory, and a battery. Control device 400 may be, for example, a tablet computer, laptop computer, desktop computer, smartphone, or the like. In some embodiments, control device 400 is the same type of device as image-capture devices 300.

As mentioned above, control device 400 may communicate with image-capture devices 300 using a peer-to-peer network 600. However, in some embodiments control device 400 is configured to connect to a finite number of image-capture devices 300 using a peer-to-peer network, for example, due to software and/or hardware limitations of control device 400. However, in some embodiments, one or more image-capture devices 300 may relay information between control device 400 and other image-capture devices 300. Thus, control device 400 may effectively communicate (e.g., indirectly through relayed communications) with a number of image-capture devices 300 that exceeds the finite number of image-capture device 300 to which control device 400 may directly connect.

As shown in FIG. 8, for example, image-capture devices 300A may be in direct communication with control device 400. Image-capture devices 300B may be in direct communication with image-capture devices 300A, and image-capture devices 300A may relay information, including commands, between image-capture devices 300B and control device 400.

As with control device 400, in some embodiments, image-capture devices 300A are also configured to communicate with a finite amount of image-capture devices 300B using a peer-to-peer network, for example, due to software and/or hardware limitations of image-capture devices 300A or of the peer-to-peer standard. Thus, the number of image-capture devices 300B that may connect to image-capture devices 300A may be limited. However, in some embodiments, image-capture devices 300B may also relay information between image-capture devices 300A and other image-capture devices, which may also relay information between other image-capture devices, and so on. In this manner, control device 400 may indirectly communicate with and control any number of image-capture devices 300 using the above-described indirect communication structure.

As shown in FIG. 9, for example, control device 400 may include a user interface 410. In some embodiments, user interface 410 includes a touch screen display for receiving user input and communicating information to the user. In some embodiments, user interface 410 includes electromechanical buttons for receiving input from a user. In some embodiments, user interface 410 includes a visual display for communicating with or displaying information to a user. In some embodiments, user interface 410 includes a combination of touch screens, electromechanical buttons, and/or visual displays. User interface 410 may display information about, for example, the status of image-capture devices 300 (e.g., remaining battery and memory levels) image-capture parameters (e.g., aperture, shutter speed, sensitivity (ISO), frame rate) of image-capture devices 300, and/or other information about image-capture unit 100 or image-capture devices 300. In some embodiments, user interface 410 may also display information about network 600 such as, for example, which devices are connected to network 600. In some embodiments, user interface 410 may also display information about processing device 500 such as, for example, the status of processing device 500 (e.g., remaining battery and memory levels, processor usage, processing status).

In some embodiments, control device 400 may receive output images 340 from image-capture devices 300, and output images 340 may be displayed on user interface 410 (see, e.g., FIG. 9). In some embodiments, control device 400 may receive and display images 340 from image-capture devices 300 in real-time. As discussed above, output images 340 may be high-resolution images and, accordingly, may have a large file size. In order to more efficiently transmit output images 340 in real-time via network 600, image-capture devices 300 may transmit to control device 400 a "preview" version of output images 340 that have been reduced in size (e.g., compressed and/or downsampled). Although control device 400 receives a reduced-size version of output images 340, the higher-quality, full-size version of output image 340 may be retained and stored in the memory of each image-capture device 300 and may be extracted (e.g., by processing device 500) for further processing in non-real-time (e.g., after a recording session). In some embodiments, control device 400 and processing device 500 are the same device. In some embodiments, control device 400 processes and combines output images 340 into combined image 360, and displays combined image 360 on user interface 410 in real-time. In some embodiments, processing device 500 processes and combines output images 340 in real-time, and then transmits combined image 360 to control device 400 for display on user interface 410 in real-time.

User interface 410 may receive input from a user of image-capture unit 100 that may be used, for example, to control functions of image-capture unit 100. For example, a user may monitor and/or adjust certain image-capture parameters of image-capture devices 300 using user interface 410. In some embodiments, a user may adjust image-capture parameters of image-capture devices 300 such as, for example, aperture, shutter speed, sensitivity (e.g., ISO), frame rate, focus point or points, focal length, white balance, and/or other parameters of image-capture devices 300. In some embodiments, a user may adjust image-capture parameters of each image-capture device 300 individually. In some embodiments, a user may adjust image-capture parameters of each image-capture device 300 simultaneously.

In some embodiments, a user may adjust the image-capture parameters of one image-capture device 300, and the image-capture parameters of one or more other image-capture devices 300 may automatically adjust based on the user's input. For example, a user may designate one image-capture device 300 as a priority device, and the other image-capture devices 300 may automatically adjust their image-capture parameters based on the image-capture parameters of the priority device. Similarly, a user may select a priority subject (e.g., a person appearing in a captured image) via user interface 410, for example, by taping on the subject shown in output image 340 on user interface 410. Then, image-capture device 300 in which the priority subject appears may automatically adjust its image-capture parameters to best capture images of the priority subject. Then, image-capture devices 300 in which the priority subject does not appear may automatically adjust their image-capture parameters based on the image-capture parameters of the priority device such that, for example, image-capture parameters of all image-capture device 300 are consistent. Such consistency between the image-capture parameters of image-capture devices 300 may, for example, improve the ability of processing device 500 to combine output images 340 and/or may improve the quality of combined image 360.

As shown in FIG. 10, for example, control device 400 may send and receive electronic data (directly or indirectly) with each of image-capture devices 300 of image-capture unit 100. The electronic data may include, for example, information and/or commands related to the image-capture parameters of each image-capture device 300, as described above.

Control device 400 may be used to synchronize image-capture device 300 such that, for example, each image-capture device 300 begins to capture images at the same time. Control device 400 and each of image-capture devices 300 may include internal clocks, which may not necessarily be synchronized. However, synchronized image-capture may be beneficial for producing a high-quality combined image 360 since non-synchronized image-capture may impair the ability processing device 500 to combine output images 340, or may cause ghosting or other undesirable effects, for example, if a subject moves between fields-of-view 330 of image-capture devices 300. Thus, as described below, control device 400 may perform a synchronizing operation in order to compensate for differences between the internal clocks of control device 400 and image-capture devices 300.

In order to synchronize (e.g., synchronizing the internal clock or synchronizing a start time for executing a command) each image-capture device 300A with control device 400, control device 400 may first send electronic data 420A to each of image-capture devices 300A, and may also store electronic data 420A in its memory. Electronic data 420A may include, for example, the time (according to the internal clock of control device 400) that control device 400 sent electronic data 420A to image-capture devices 300A. Then, when image-capture devices 300A receive electronic data 420 from control device 400, each image-capture device 300A may send electronic data 430A back to control device 400. Electronic data 430A may include, for example, the time (according to the internal clock of each image-capture device 300A) that each image-capture device 300A received electronic data 420A from control device 400. Then, when control device 400 receives electronic data 430A from each image-capture device 300A, control device 400 may store electronic data 430A in its memory. Control device 400 and may also store in its memory the time (according to the internal clock of control device 400) at which control device 400 received electronic data 430A from each image-capture device 300A.

Control device 400 may calculate the difference between the internal clock of control device 400 and the internal clock of each image-capture devices 300A, with compensation for network latency (e.g., the time required for electronic data 420A to travel between control device 400 and each image-capture device 300A). For example, to compensate for network latency, control device 400 may compute the average of the difference between the time electronic data 420A was sent by control device 400 and the time electronic data 430A was received by control device 400. Then, control device may determine the difference between the internal clock of control device 400 and the internal clock of image-capture device 300A by subtracting the determined network latency from the difference between the time (according to the internal clock of control device 400) that control device sent electronic data 420A and the time (according to the internal clock of image-capture device 300A) that image-capture device 300A received electronic data 430A. In some embodiments, during a synchronization operation, control device 400 and image-capture devices 300 may minimize or cease network traffic unrelated to the synchronization process (e.g., image previews, described above) in order to minimize the network latency and/or fluctuation of network latency during the synchronization process, which may help to more accurately determine the amount of network latency, and thus the difference between internal clocks of image-capture devices 300A and control device 400.

After control device 400 has calculated the differences between the internal clock of control device 400 and the internal clock of each image-capture device 300A, the calculated time differences may be used to synchronize image capturing of image-capture devices 300A. For example, a user may initiate image capturing of image-capture devices 300A using user interface 410 of control device 400. Then, control device 400 may select a recording start time that may be, for example, several seconds in the future. Then control device 400 may communicate the recording start time to image-capture devices 300A, with a compensation for the determined differences between the internal clock of control device 400 and the internal clock of each image-capture device 300A.

For example, using the process described above, control device 400 may determine that a first image-capture device 300A has an internal clock that is 100 milliseconds ahead of the internal clock of control device 400. Likewise, using the process described above, control device may determine that a second image-capture device 300A has an internal clock that is 200 milliseconds behind the internal clock of control device 400. After a user initiates image capturing (e.g., using user interface 410), control device 400 may choose a recording start time that that is 2000 milliseconds in the future (relative to the internal clock of control device 400). However, to compensate for the time difference between the internal clock of control device 400 and the internal clock of the first image-capture device 300A, control device 400 may instruct the first image-capture device 300A to begin recording in 2100 milliseconds (e.g., 2000 plus 100 milliseconds). Likewise, to compensate for the time difference between the internal clock of control device 400 and the internal clock of the second image-capture device 300A, control device may instruct the first image-capture device 300A to begin recording in 1800 milliseconds (e.g., 2000 minus 200 milliseconds) Thus, first and second image-capture devices 300A may begin capturing images at the same time, despite difference between the internal clocks of control device 400, the first image-capture device 300A, and the second image-capture device 300A.

As described above, in some embodiments, some image-capture devices 300A may act as hubs (e.g., information relays) between control device 400 and other image-capture devices 300B. Thus, in some embodiments, it may be necessary to calculate the difference between the internal clock of image-capture device 300A and the internal clocks of image-capture devices 300B that are connected to the image-capture device 300A. The calculation and synchronization of image-capture devices 300A and 300B may use a similar process to that describe above with respect to control device 400 and image-capture devices 300A.

For example, in order to synchronize the internal clock of image-capture device 300A with image-capture devices 300B, image-capture device 300A may first send electronic data 420B to each of image-capture devices 300B, and may also store electronic data 420B in its memory. Electronic data 420B may include, for example, the time (according to the internal clock of image-capture device 300A) that image-capture device 300A sent electronic data 420B to image-capture devices 300B. Then, when image-capture devices 300B receive electronic data 420B from image-capture device 300A, each image-capture device 300B may send electronic data 430B back to image-capture device 300A. Electronic data 430B may include, for example, the time (according to the internal clock of each image-capture device 300B) that each image-capture device 300B received electronic data 420B from image-capture device 300A. Then, when image-capture device 300A receives electronic data 430B from each image-capture device 300B, image-capture device 300A may store electronic data 430B in its memory. Image-capture device 300A may also store in its memory the time (according to the internal clock of image-capture device 300A) at which image-capture device 300A received electronic data 430B from each image-capture device 300B.

Image-capture device 300A may calculate the difference between the internal clock of image-capture device 300A and the internal clock of each image-capture devices 300B, with compensation for network latency (e.g., the time required for electronic data 420B to travel between image-capture device 300A and each image-capture device 300B). For example, to compensate for network latency, image-capture device 300A may compute the average of the difference between the time electronic data 420B was sent by image-capture device 300A and the time electronic data 430B was received by image-capture device 300A. Then, image-capture device 300A may determine the difference between the internal clock of image-capture device 300A and the internal clock of image-capture device 300B by subtracting the determined network latency from the difference between the time (according to the internal clock of image-capture device 300A) that control device sent electronic data 420B and the time (according to the internal clock of image-capture device 300B) that image-capture device 300B received electronic data 430B. In some embodiments, during a synchronization operation, image-capture device 300A and image-capture devices 300B may minimize or cease network traffic unrelated to the synchronization process (e.g., image previews, described above) in order to minimize the network latency and/or fluctuation of network latency during the synchronization process, which may help to more accurately determine the amount of network latency, and thus the time difference between internal clocks of image-capture devices 300B and image-capture device 300A.

After image-capture device 300A has calculated the differences between the internal clock of image-capture device 300A and the internal clock of each image-capture device 300B, the calculated time differences may be used to synchronize image capturing of image-capture devices 300A and 300B. For example, a user may initiate image capturing of image-capture devices 300A and 300B using user interface 410 of control device 400. Then, control device 400 may select a recording start time that may be, for example, several seconds in the future. Then control device 400 may communicate the recording start time to image-capture devices 300A, with a compensation for the determined differences between the internal clock of control device 400 and the internal clock of each image-capture device 300A. Likewise image-capture devices 300A may communicate the recording start time to image-capture devices 300B, with a compensation for the determined differences between the internal clock of image-capture devices 300A and the internal clock of each image-capture device 300B.

As mentioned above, in some embodiments, image-capture devices 300B may also act as a hub for relaying information between image-capture devices 300A and other image-capture devices (not shown), which may also act as a hub for relaying information between additional image-capture devices, and so on. In some embodiments where additional image-capture devices are included, a synchronization process that is similar to the synchronization process described above with respect to image-capture devices 300A and 300B may be used to synchronize the additional image-capture devices.

In some embodiments, the communication pathways and processes described above may also be used to send electronic data (e.g., commands and instructions) between control device 400 and image-capture devices 300 for purposes other than the above-described time synchronization process. For example, the above-mentioned communication pathways and processes may be used to send and receive commands, instructions, and/or other information related to image-capture parameters of image-capture devices 300. In some embodiments, for example, certain image-capture parameters may be adjusted in real-time while image-capture devices 300 are capturing images (e.g., while recording a video) and, thus, it may be beneficial to make adjustments to the image-capture parameters simultaneously. Accordingly, control device 400, for example, may send time-based commands to image-capture devices 300 with a compensation for the determined differences between the internal clock of control device 400 and the internal clock of each image-capture device 300, thereby permitting the image-capture parameters of image-capture devices 300 to be adjusted simultaneously. In some embodiments, control device 400 may calculate the differences between the internal clock of control device 400 and the internal clock of each image-capture device 300 each time that a new command is issued. In some embodiments, control device 400 may calculate the differences between the internal clock of control device 400 and the internal clock of each image-capture device 300 only at certain intervals (e.g., once every minutes, once every one hour, or once per recording session) and, between intervals, may issues commands based on the previously calculated differences between the internal clock of control device 400 and the internal clock of each image-capture device 300.

Figure 11:
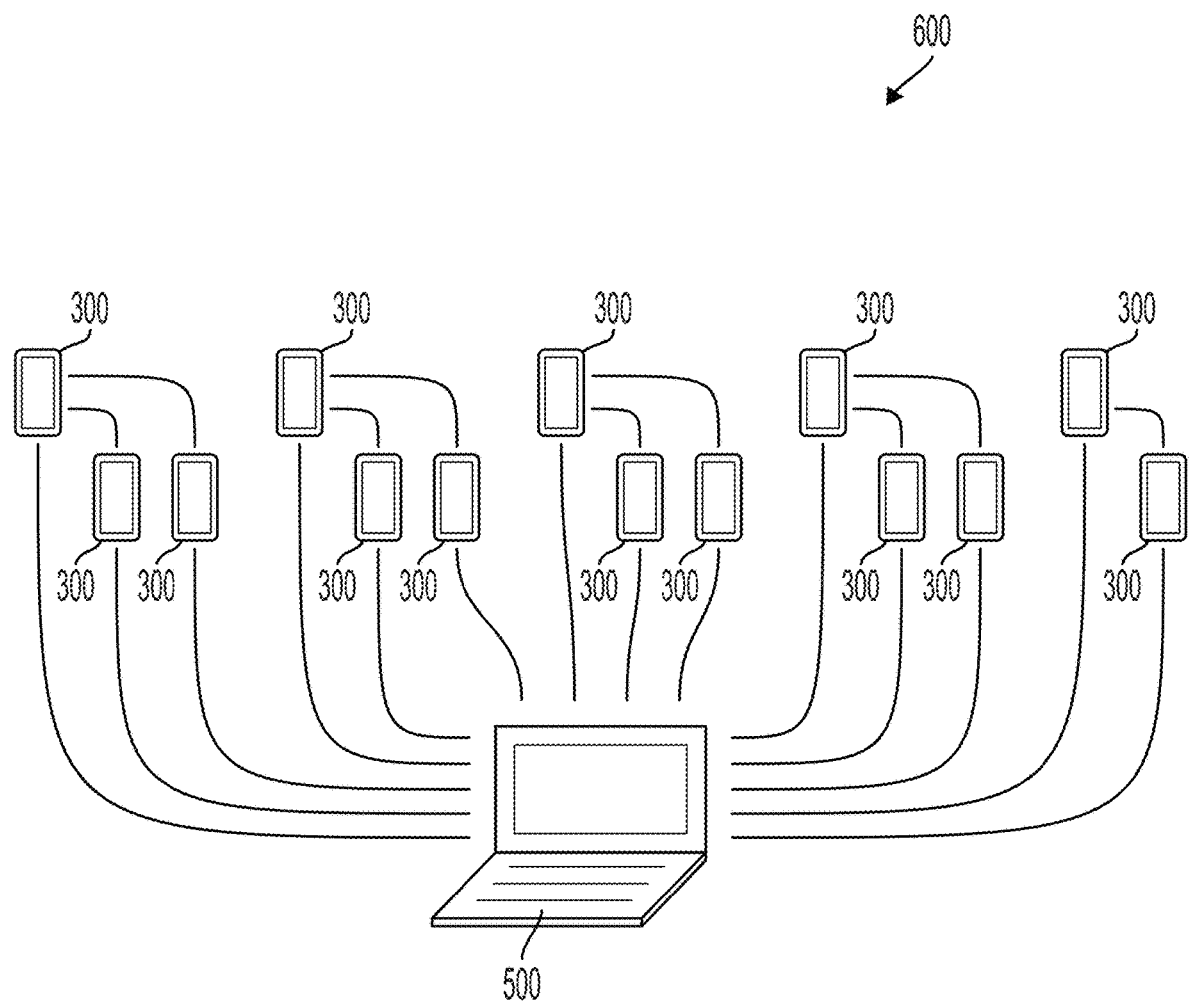
FIG. 11 shows a schematic diagram of an exemplary network including the image-capture devices and the processing device of FIG. 7.

As shown in FIG. 11, network 600 may include processing device 500 and image-capture devices 300. In some embodiments, processing device 500 receives images and/or other image-related data (e.g., image-capture parameters) from image-capture devices. As mentioned above, in some embodiments, image-capture devices 300 may communicate with processing device 500 through a wireless connection. In some embodiments, image-capture devices 300 each communicate with processing device 500 via a direct wireless connection. In some embodiments, some image-capture devices 300 directly communicate with processing device 500 and some communicate indirectly (e.g., through another image-capture device 300) using an indirect communication structure as described above with respect to control device 400. In some embodiments, image-capture devices 300 communicate with processing device 500 using a wired connection. In some embodiments, image-capture devices 300 communicate with control device 400 using a wireless connection, and image-capture devices 300 communicate with processing device 500 using a wired connection.

In some embodiments, processing device 500 may be a computing device and may include, for example, a processor, internal memory, and a battery. Processing device 500 may be, for example, a tablet computer, laptop computer, desktop computer, or the like. In some embodiments, processing device 500 may be a smartphone. In some embodiments, processing device 500 may be the same type of device as image-capture devices 300. In some embodiments, processing device 500 may be control device 400. In some embodiments, processing device 500 may be one of image-capture devices 300. In some embodiments, image processing may be distributed and performed by one or more of image-capture devices 300. In some embodiments, image processing may be distributed and performed by one or more of image-capture devices 300 and control device 400. It may be beneficial in some embodiments for processing device 500 to be a separate device from control device 400, since the operations performed by processing device may be more processor-intensive and may benefit from more capable hardware than is needed for control device 400. In this way, control device 400 can be a more lightweight, portable device (e.g., a tablet computer or smartphone) than processing device 500 (e.g., a desktop or laptop computer).

In some embodiments, each image-capture device 300 may save image data as well as image-parameter data (e.g., the image-capture parameters used when capturing the image) and the image parameter data may be associated with the image data that it relates to. Processing device 500 may receive the image data and may use the image data to make adjustments and/or compensations to the images when processing and combining output images 340. For example, in some embodiments, one image-capture device 300 may have certain image-capture parameters that are different from another image-capture device 300. Processing device 500 may then use the image data to make adjustments (e.g., exposure or coloring) to output images 340, for example, to improve the quality of combined image 360.

As mentioned above, processing device 500 may use an image-stitching process in order to combine overlapping portions 341 together. For example, processing device 500 may analyze and make certain alterations to output images 340 in order to create a more seamless, combined image 360. For example, processing device may first detect key points (e.g., edges, corners, or other distinctive features) in overlapping portions 341. Then, processing device 500 may match the detected key points of overlapping portions 341 together. Then, processing device 500 may, for example, align, transform, rotate and/or translate output images 340 or portions of output images 340 based on the matched key points. Then, processing device 500 may composite (e.g., combine) output images 340 together in order to produce a combined image 360. In some embodiments, processing device 500 may blend, calibrate, or perform other operations on output images 340 in order to combine output images 340 into a seamless, combined image 360. In some embodiments, processing device may include a software application that is configured to automatically combine output images 340. In some embodiments, output images 340 may be videos, and processing device 500 may combine output images 340 together frame-by-frame.

In some embodiments, processing device 500 may use estimated depth data (described above) to more accurately combine output images 340. For example, estimated depth data may provide information related to the physical distance of different pixels in output images 340. Accordingly, such depth information, along with the other detections and comparisons described above, may permit processing devices 500 to combine output images 340 with greater nuance and accuracy. Likewise, such depth information may permit processing device to more accurately detect and compare objects as they pass from one output images 340 to another, which may facilitate a more seamless, combined output image 360.

As shown in FIG. 12, in some embodiments, image-capture unit 100 may include image-capture devices 300 that are disposed on a first end 202 (e.g., the top) of image-capture unit structure 200 and that are directed in a generally upward direction. FIG. 12 shows only two image-capture device 300 disposed on first end 202 of image-capture unit structure 200. However, image-capture unit 100 may include more than, or less than, two image-capture devices 100 disposed on first end 202 of image-capture unit structure 200. In some embodiments, for example, image-capture unit 100 includes, one, two, three, four, five, or more image-capture devices 300 disposed on first end 202 of image-capture unit structure 200. Image-capture devices 300 that are disposed on first end 202 of image-capture unit structure 200 may include the same features and functionality as the other images-capture devices 300 described herein. Further, FIG. 12 shows only two image-capture devices 300 disposed on the sides of image-capture unit structure 200. However, as described above, image-capture unit 100 may include any number of image-capture devices 300 disposed radially around central axis 110.

In some embodiments, image-capture devices 300 that are disposed on first end 202 of image-capture unit structure 200 may have fields-of-view 330 that include portions that are directed in an axial direction (e.g., vertical direction) relative to central axis 110. In some embodiments, image-capture devices 300 that are disposed on first end 202 of image-capture unit structure 200 may have field-of-view centerlines 334 that are directed in a non-axial direction relative to central axis 110, but fields-of-view 330 of the image-capture devices 300 that are disposed on first end 202 may overlap with one another at overlapping portions 331. Likewise, in some embodiments, image-capture devices 300 that are disposed on first end 202 of image-capture unit structure 200 may have field-of-view centerlines 334 that are directed in a non-horizontal direction relative to central axis 110, but fields-of-view 330 of the image-capture devices 300 that are disposed on first end 202 may overlap with the fields-of-view 330 of image-capture devices that are disposed radially about central axis 110. In some embodiments, image-capture unit 100 may also include image-capture devices 300 disposed on second end 204 (e.g., the bottom) of image-capture unit structure 200.

An example of an image-capture unit structure 200 (including structure for supporting image-capture devices 300 that are disposed on first end 202) is shown in U.S. Design patent application No. 29/701,978, filed Aug. 15, 2019, titled "VIDEO DEVICE STAND," which is incorporated herein by reference thereto.

As shown in FIG. 12, in some embodiments, combined field-of-view 350 is defined by a combined angle-of-view 358. Combined angle-of-view 358 may be, for example, the angular extent (e.g., angular size) to which combined field-of-view 350 extends in a plane that is coplanar with central axis 110 and is parallel to central axis 110. In some embodiments, combined angle-of-view 358 may be the angular extent (e.g., angular size) to which combined field-of-view 350 extends in a vertical plane that is coplanar with central axis 110. In some embodiments, combined angle-of-view 358 may be 360 degrees. However, in some embodiments, combined angle-of-view 358 is less than 360 degrees. For example, in some embodiments, combined angle-of-view 358 is between approximately 360 degrees and 180 degrees. In some embodiments, combined angle-of-view 358 is between approximately 270 degrees and 180 degrees. In some embodiments, image-capture devices 300 that are disposed on first end 202 of image-capture unit structure 200 and image-capture devices 300 that are disposed radially about central axis 110 may, together, include a combined field-of-view that is at least hemispherical in shape, or has a shape that includes a portion of a sphere. In some embodiments, image-capture devices 300 that are disposed on first end 202 of image-capture unit structure 200, image-capture devices 300 that are disposed on second end 204 of image-capture unit structure 200, and image-capture devices 300 that are disposed radially about central axis 110 may, together, include a combined field-of-view that is spherical in shape.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A system for producing a continuous image from separate image sources, the system comprising:
    an image-capture unit, comprising:
        image-capture devices for simultaneously capturing images, and
        an image-capture unit structure for supporting the image-capture devices in fixed positions relative to each other and to the image-capture unit structure, wherein the image-capture devices are disposed radially around a central axis of the image-capture unit,
    wherein a centerline of the field-of-view of each of the image-capture devices forms at least a 30-degree angle with a radial line extending from the central axis,
    wherein the centerline of the field of view of each of the image-capture devices is orientated in the same of a clockwise direction or a counterclockwise direction about the central axis as are the centerlines of the fields of view of each of two adjacent image-capture devices;
    wherein the field-of-view of each of the image-capture devices overlaps with the fields-of-view of two adjacent image-capture devices, and
    wherein the fields-of-view of the image-capture devices together comprise a 360 degree field-of-view.

2. The system for producing a continuous image from separate image sources of claim 1, further comprising a control device, wherein the control device is in communication with the image-capture devices, and wherein the control device is configured to send synchronized commands to the image-capture devices.

3. The system for producing a continuous image from separate image sources of claim 2, wherein the image-capture devices communicate with the control device through a wireless connection.

4. The system for producing a continuous image from separate image sources of claim 2, wherein the control device is configured to receive images captured by the image-capture devices simultaneously and in real-time.

5. The system for producing a continuous image from separate image sources of claim 2, wherein the control device is a tablet computer.

6. The system for producing a continuous image from separate image sources of claim 2, further comprising a processing device, wherein the processing device is in communication with the image-capture devices, and wherein the processing device is configured to receive and process images captured by the image-capture devices.

7. The system for producing a continuous image from separate image sources of claim 1, wherein each of the image-capture devices comprises a processor, internal memory, and a battery, and wherein each of the image-capture devices is configured to simultaneously capture images without any wired connection to the control device or to another component of the image-capture unit.

8. The system for producing a continuous image from separate image sources of claim 1, wherein the image-capture devices are smartphones.

9. The system for producing a continuous image from separate image sources of claim 1, wherein the image-capture unit comprises more than 10 of the image-capture devices.

10. The system for producing a continuous image from separate image sources of claim 1, wherein the image-capture devices are fixed relative to each other by the image-capture unit structure in a cylindrical arrangement.

11. The system for producing a continuous image from separate image sources of claim 1, wherein the image-capture unit has a footprint area of less than 1 square foot.

12. The system for producing a continuous image from separate image sources of claim 1, wherein the field-of-view of each image-capture device overlaps with the fields of view of two adjacent image-capture devices within a 3-foot radius of the central axis.

13. The system for producing a continuous image from separate image sources of claim 1, wherein the centerline of the field-of-view of each of the image-capture devices forms at least a 45-degree angle with a radial line extending from the central axis.

14. The system for producing a continuous image from separate image sources of claim 1, wherein the centerlines of the fields-of-view of each of the image-capture devices are coplanar.

15. The system for producing a continuous image from separate image sources of claim 1, wherein the angle of the centerline of the field-of-view of each image-capture device with respect to the centerline of the field-of-view of an adjacent image-capture device is between 10 and 35 degrees.

16. The system for producing a continuous image from separate image sources of claim 1, wherein an output image of each image-capture device overlaps with the output images of two adjacent image-capture devices, and wherein a ratio of non-overlapping portions to overlapping portions of each output image is at least 3:1.

17. The system for producing a continuous image from separate image sources of claim 1, wherein each image-capture device comprises an audio input and is configured to capture audio from the direction of the field-of-view of the image-capture device.

18. The system for producing a continuous image from separate image sources of claim 1, further comprising second image-capture devices disposed above the first image-capture devices and held in a fixed position relative to the first image-capture devices by the image-capture unit structure,
    wherein the field-of-view of each of the second image-capture devices includes a portion directed in an axial direction relative to the central axis, and
    wherein the field-of-view of each second image-capture device overlaps with the field-of-view of another second image-capture and overlaps with the field-of-view of a first image-capture device.

19. The system for producing a continuous image from separate image sources of claim 18, wherein the fields of view of the first and second image-capture devices together comprise at least a hemispherical field-of-view.

20. A system for producing a continuous image from separate image sources, the system comprising:
- computing devices, wherein each computing device comprises an image-capture device, a processor, and memory;
- a support structure for supporting the computing devices in fixed positions relative to each other and to the support structure; and
- a control device configured to wirelessly communicate with each of the computing devices,
- wherein the control device is configured to send commands to the computing devices, wherein each computing device is configured to independently adjust image-capture parameters of its respective image-capture device based on the commands received from the control device, and wherein the control device is configured to receive images captured by the image-capture devices in real-time, and
- wherein the control device is configured to send commands to adjust an image-capture parameter of some of the image-capture devices based on an image-capture parameter of a selected one of the image-capture devices.

21. The system for producing a continuous image from separate image sources of claim 20, wherein the control device directly communicates with at least one computing device using peer-to-peer communication, wherein the at least one computing device relays information received from the control device to a second computing device using peer-to-peer communication, and wherein the at least one computing devices relays information received from the second computing devices to the control device using peer-to-peer communication.

22. The system for producing a continuous image from separate image sources of claim 20, wherein the system comprises at least 10 image-capture devices.

23. The system for producing a continuous image from separate image sources of claim 20, wherein the images captured by each image-capture device are stored as image data in the memory of the respective computing device, and wherein the images received by the control device include less image data than the respective images stored in the memory of the respective computing devices.

24. The system for producing a continuous image from separate image sources of claim 20, wherein the adjustable image-capture parameters include at least one of aperture, shutter speed, sensitivity, frame rate, focus point, focal length, and white balance.

25. The system for producing a continuous image from separate image sources of claim 20, wherein the control device transmits electronic data to at least one of the computing devices, wherein the at least one computing device transmits electronic data to the control device, and wherein the electronic data received by the control device from the at least one computing device is used to determine a time difference between an internal clock of the control device and an internal clock of the at least one computing device.

26. The system for producing a continuous image from separate image sources of claim 25, wherein the control device determines the time difference between the internal clock of the control device and the internal clock of a first computing device, wherein the control device determines the time difference between the internal clock of the control device and an internal clock of a second computing device, wherein the control device transmits a first synchronized start time to the first computing device and a second synchronized start time to the second computing device, and wherein the first synchronized start time and the second synchronized start time are different times according to the internal clock of the first image-capture device and the internal clock of the second image-capture device.

27. The system for producing a continuous image from separate image sources of claim 20, wherein the computing devices are fixed relative to each other by the support structure within a 3 square foot area.

28. A method of producing a continuous image from separate image sources, the method comprising:
- transmitting first electronic data from a control device to an image-capture device, wherein the first electronic data comprises the time the control device sent the first electronic data according to an internal clock of the control device;
- transmitting second electronic data from the image-capture device to the control device, wherein the second electronic data comprises the time the first electronic data was received by the image-capture device according to an internal clock of the image-capture device; and
- determining the time difference between the internal clock of the control device and the internal clock of the image-capture device.

29. The method of producing a continuous image from separate image sources of claim 28, further comprising:
- transmitting third electronic data from the control device to the image-capture device, wherein the third electronic data comprises a synchronized start time according to the internal clock of the image-capture device.

30. The method of producing a continuous image from separate image sources of claim 28, further comprising:
- transmitting third electronic data from the control device to a second image-capture device, wherein the third electronic data comprises the time the control device sent the third electronic data according to the internal clock of the control device;
- transmitting fourth electronic data from the second image-capture device to the control device, wherein the fourth electronic data comprises the time the third electronic data was received by the second image-capture device according to an internal clock of the second image-capture device; and
- determining the time difference between the internal clock of the control device and the internal clock of the second image-capture device.

31. The method of producing a continuous image from separate image sources of claim 30, further comprising:
- transmitting fifth electronic data from the control device to the first image-capture device, wherein the fifth electronic data comprises a first synchronized start time according to the internal clock of the first image-capture device;
- transmitting sixth electronic data from the control device to the second image-capture device, wherein the sixth electronic data comprises a second synchronized start time according to the internal clock of the second image-capture device;
- wherein the first synchronized start time and the second synchronized start time are the same time according to the internal clock of the control device.

32. The method of producing a continuous image from separate image sources of claim 31, wherein the first synchronized start time and the second synchronized start time are different times according to the internal clock of the first image-capture device and the internal clock of the second image-capture device.

* * * * *